US011412266B2

(12) United States Patent
Aksu et al.

(10) Patent No.: US 11,412,266 B2
(45) Date of Patent: Aug. 9, 2022

(54) HIGH LEVEL SYNTAX FOR COMPRESSED REPRESENTATION OF NEURAL NETWORKS

(71) Applicant: Nokia Technologies Oy, Espoo (FI)

(72) Inventors: Emre Baris Aksu, Tampere (FI); Miska Matias Hannuksela, Tampere (FI); Hamed Rezazadegan Tavakoli, Espoo (FI); Francesco Cricri, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/140,512

(22) Filed: Jan. 4, 2021

(65) Prior Publication Data

US 2021/0211733 A1 Jul. 8, 2021

Related U.S. Application Data

(60) Provisional application No. 62/957,982, filed on Jan. 7, 2020.

(51) Int. Cl.
| | | |
|---|---|---|
| *H04N 19/70* | (2014.01) | |
| *H04N 19/61* | (2014.01) | |
| *H04N 19/46* | (2014.01) | |
| *G06N 3/04* | (2006.01) | |

(52) U.S. Cl.
CPC .......... *H04N 19/70* (2014.11); *G06N 3/0454* (2013.01)

(58) Field of Classification Search
None
See application file for complete search history.

(56) References Cited

U.S. PATENT DOCUMENTS

| | | | |
|---|---|---|---|
| 2015/0264404 A1* | 9/2015 | Hannuksela | H04N 19/30 375/240.16 |
| 2018/0198642 A1* | 7/2018 | Regev | H04L 12/42 |
| 2020/0151120 A1* | 5/2020 | Thyamagondlu | G06F 13/4027 |
| 2021/0174214 A1* | 6/2021 | Venkatesan | G06N 3/04 |

FOREIGN PATENT DOCUMENTS

| | | |
|---|---|---|
| WO | WO-98/32281 | 1/1998 |
| WO | WO2020236976 | * 11/2020 |

OTHER PUBLICATIONS

Minezawa, Akira, et al., Proposed high-level syntax specification for ISO/IEC 15938-17, Mitsubishi Electric Corporation, Oct. 2019, 9 pages.

(Continued)

*Primary Examiner* — Christopher Braniff
(74) *Attorney, Agent, or Firm* — Joseph C. Drish; Harrington & Smith

(57) ABSTRACT

An apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network; wherein the high-level bitstream syntax comprises at least one information unit having metadata or compressed neural network data of a portion of the at least one neural network; and wherein a serialized bitstream comprises one or more of the at least one information unit.

25 Claims, 11 Drawing Sheets

(56) References Cited

OTHER PUBLICATIONS

"Neural Network Exchange Format", The Khronos NNEF Working Group, Version 1.0, Revision 3, Jun. 13, 2018, 96 pages.
"Description of Core Experiments on Compression of neural networks for multimedia content description and analysis", Video, ISO/IEC JTC 1/SC 29 WG11, N18491, Apr. 30, 2019, 17 pages.
"Test model 1 of Compression of neural networks for multimedia content description and analysis", Video, ISO/IEC JTC 1/SC 29/WG 11 N18701, Aug. 30, 2019, 9 pages.
"Information technology—Multimedia content description interface—Part 17: Compression of neural networks for multimedia content description and analysis", DIS stage, ISO JTC 1/SC 29/WG 11, ISO 15938-17, 80 pages.

* cited by examiner

```
graph AlexNet( input ) -> ( output )                                    800
{
    input = external(shape = [1, 3, 224, 224]);
    kernel1 = variable(shape = [64, 3, 11, 11], label = 'alexnet_v2/conv1/kernel');
    bias1 = variable(shape = [1, 64], label = 'alexnet_v2/conv1/bias');
    conv1 = conv(input, kernel1, bias1, padding = [(0,0), (0,0)],
            border = 'constant', stride = [4, 4], dilation = [1, 1]);
    relu1 = relu(conv1);
    pool1 = max_pool(relu1, size = [1, 1, 3, 3], stride = [1, 1, 2, 2],
            border = 'ignore', padding = [(0,0), (0,0), (0,0), (0,0)]);
    kernel2 = variable(shape = [192, 64, 5, 5] label = 'alexnet_v2/conv2/kernel');
    bias2 = variable(shape = [1, 192], label = 'alexnet_v2/conv2/bias');
    conv2 = conv(pool1, kernel2, bias2, padding = [(2,2), (2,2)],
            border = 'constant', stride = [1,1], dilation = [1, 1]);
    relu2 = relu(conv2);
    pool2 = max_pool(relu2, size = [1, 1, 3, 3,], stride = [1, 1, 2, 2,],
            border = 'ignore', padding = [(0,0), (0,0), (0,0), (0,0)]);
    kernel3 = variable(shape = [384, 192, 3, 3], label = 'alexnet_v2/conv3/kernel');
    bias3 = variable(shape = [1, 384], label = 'alexnet_v2/conv3/bias');
    conv3 = conv(pool2, kernel3, bias3, padding = [(1,1), (1,1)],
            border = 'constant', stride = [1,1], dilation = [1, 1]);
    relu3 = relu(conv3);
    kernel4 = variable(shape = [384, 384, 3, 3], label = 'alexnet_v2/conv4/kernel');
    bias4 = variable(shape = [1, 384], label = 'alexnet_v2/conv4/bias');
    conv4 = conv(relu3, kernel4, bias4, padding = [(1,1), (1,1)],
            border = 'constant', stride = [1, 1], dilation = [1, 1]);
    relu4 = relu(conv4);
    kernel5 = variable(shape = [256, 384, 3, 3], label = 'alexnet_v2/conv5/kernel');
    bias5 = variable(shape = [1, 256], label = 'alexnet_v2/conv5/bias');
    conv5 = conv(relu4, kernel5, bias5, padding = [(1,1), (1,1)],
            border = 'constant', stride = [1, 1], dilation = [1, 1]);
    relu5 = relu(conv5);
    pool3 = max_pool(relu5, size = [1, 1, 3, 3], stride = [1, 1, 2, 2],
            border = 'ignore', padding = [(0,0), (0,0), (0,0), (0,0)]);
    kernel6 = variable(shape = [4096, 256, 5, 5], label = 'alexnet_v2/fc6/kernel');
    bias6 = variable(shape = [1, 4096], label = 'alexnet_v2/fc6/bias');
    conv6 = conv(pool3, kernel6, bias6, padding = [(0,0,), (0,0)],
            border = 'constant', stride = [1, 1], dilation = [1, 1]);
    relu6 = relu(conv6);
    kernel7 = variable(shape = [4096, 4096, 1, 1], label = 'alexnet_v2/fc7/kernel');
    bias7 = variable(shape = [1, 4096], label = 'alexnet_v2/fc7/bias');
    conv7 = conv(relu6, kernel7, bias7, padding = [(0,0,), (0,0)],
            border = 'constant', stride = [1, 1], dilation = [1, 1]);
    relu7 = relu(conv7);
    kernel8 = variable(shape = [1000, 4096, 1, 1], label = 'alexnet_v2/fc8/kernel');
    bias8 = variable(shape = [1, 1000], label = 'alexnet_v2/fc8/bias');
    conv8 = conv(relu7, kernel8, bias8, padding = [(0,0,), (0,0)],
            border = 'constant', stride = [1, 1], dilation = [1, 1]);
    output = softmax(conv8);
}
```

FIG.8

HIGH LEVEL SYNTAX FOR COMPRESSED REPRESENTATION OF NEURAL NETWORKS

RELATED APPLICATION

This application claims priority to U.S. Provisional Application No. 62/957,982, filed Jan. 7, 2020, which is hereby incorporated by reference in its entirety.

TECHNICAL FIELD

The examples and non-limiting embodiments relate generally to multimedia transport and neural networks and, more particularly, to high level syntax for a compressed representation of neural networks.

BACKGROUND

It is known to provide standardized formats for exchange of neural networks.

SUMMARY

In accordance with an aspect, an apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network; wherein the high-level bitstream syntax comprises at least one information unit having metadata or compressed neural network data of a portion of the at least one neural network; and wherein a serialized bitstream comprises one or more of the at least one information unit.

In accordance with an aspect, a method includes encoding or decoding a high-level bitstream syntax for at least one neural network; wherein the high-level bitstream syntax comprises at least one information unit having metadata or compressed neural network data of a portion of the at least one neural network; and wherein a serialized bitstream comprises one or more of the at least one information unit.

In accordance with an aspect, a non-transitory program storage device readable by a machine, tangibly embodying a program of instructions executable by the machine for performing operations is provided, the operations comprising: encoding or decoding a high-level bitstream syntax for at least one neural network; wherein the high-level bitstream syntax comprises at least one information unit having metadata or compressed neural network data of a portion of the at least one neural network; and wherein a serialized bitstream comprises one or more of the at least one information unit.

BRIEF DESCRIPTION OF THE DRAWINGS

The foregoing aspects and other features are explained in the following description, taken in connection with the accompanying drawings, wherein:

FIG. 8 shows an example topology description of AlexNet which is in neural network exchange format (NNEF) topology graph format.

DETAILED DESCRIPTION OF EXAMPLE EMBODIMENTS

Figure 1:
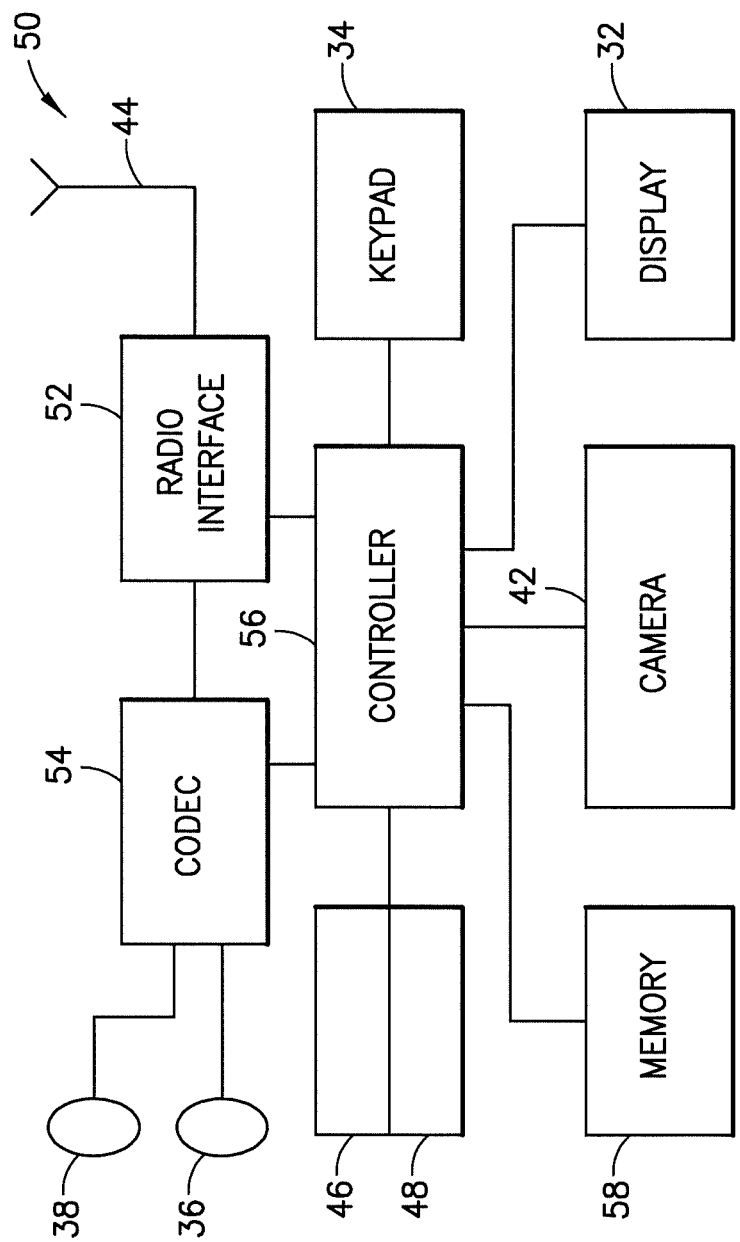
FIG. 1 shows schematically an electronic device employing embodiments of the examples described herein.
Figure 2:
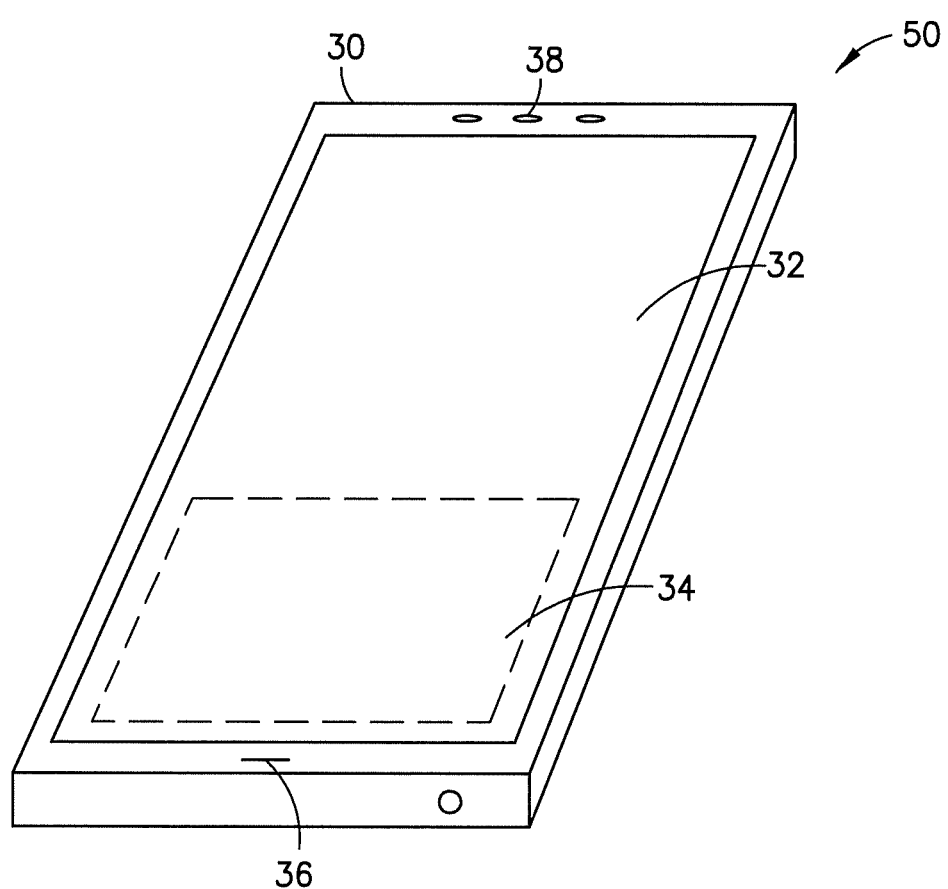
FIG. 2 shows schematically a user equipment suitable for employing embodiments of the examples described herein.

The following acronyms and abbreviations that may be found in the specification and/or the drawing figures are defined as follows:

3GP 3GPP file format
3GPP 3rd Generation Partnership Project
3GPP TS 3GPP technical specification
4CC four character code
4G fourth generation of broadband cellular network technology
5G fifth generation cellular network technology
5GC 5G core network
ACC accuracy
AI artificial intelligence
AIoT AI-enabled IoT
a.k.a. also known as
AMF access and mobility management function
AVC advanced video coding
CDMA code-division multiple access
CE core experiment
CU central unit
DASH dynamic adaptive streaming over HTTP
DCT discrete cosine transform
DSP digital signal processor
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDMA frequency division multiple access
f(n) fixed-pattern bit string using n bits written (from left to right) with the left bit first.
F1 or F1-C interface between CU and DU control interface
gNB (or gNodeB) base station for 5G/NR, i.e., a node providing NR user plane and control plane protocol terminations towards the UE, and connected via the NG interface to the 5GC
GSM Global System for Mobile communications
H.222.0 MPEG-2 Systems is formally known as ISO/IEC 13818-1 and as ITU-T Rec. H.222.0
H.26x family of video coding standards in the domain of the ITU-T
HLS high level syntax
IBC intra block copy
ID identifier
IEC International Electrotechnical Commission
IEEE Institute of Electrical and Electronics Engineers
I/F interface
IMD integrated messaging device
IMS instant messaging service
I/O input/output
IoT internet of things
IP internet protocol
ISO International Organization for Standardization
ISOBMFF ISO base media file format
ITU International Telecommunication Union
ITU-T ITU Telecommunication Standardization Sector
LTE long-term evolution
LZMA Lempel-Ziv-Markov chain compression
LZMA2 simple container format that can include both uncompressed data and LZMA data
LZO Lempel-Ziv-Oberhumer compression
LZW Lempel-Ziv-Welch compression
MAC medium access control
mdat MediaDataBox
MME mobility management entity
MMS multimedia messaging service
moov MovieBox
MP4 file format for MPEG-4 Part 14 files
MPEG moving picture experts group
MPEG-2 H.222/H.262 as defined by the ITU
MPEG-4 audio and video coding standard for ISO/IEC 14496
MSB most significant bit
NAL network abstraction layer
NDU NN compressed data unit
ng or NG new generation
ng-eNB or NG-eNB new generation eNB
NN neural network
NNEF neural network exchange format
NNR neural network representation
NR new radio (5G radio)
num number
N/W or NW network
ONNX Open Neural Network eXchange
PB protocol buffers
PC personal computer
PDA personal digital assistant
PDCP packet data convergence protocol
PHY physical layer
PID packet identifier
PLC power line communication
PSNR peak signal-to-noise ratio
RAM random access memory
RAN radio access network
RFC request for comments
RFID radio frequency identification
RFM reference frame memory
RLC radio link control
RRC radio resource control
RRH remote radio head
RU radio unit
Rx receiver/reception
SDAP service data adaptation protocol
SGW serving gateway
SMF session management function
SMS short messaging service
st(v) null-terminated string encoded as UTF-8 characters as specified in ISO/IEC 10646
SVC scalable video coding
S1 interface between eNodeBs and the EPC
TCP-IP transmission control protocol-internet protocol
TDMA time divisional multiple access
trak TrackBox
TS transport stream
TV television
Tx transmitter/transmission
UE user equipment
ue(v) unsigned integer Exp-Golomb-coded syntax element with the left bit first
UICC Universal Integrated Circuit Card
UMTS Universal Mobile Telecommunications System
u(n) unsigned integer using n bits
UPF user plane function
URI uniform resource identifier
URL uniform resource locator
UTF-8 8-bit Unicode Transformation Format
WLAN wireless local area network
X2 interconnecting interface between two eNodeBs in LTE network
Xn interface between two NG-RAN nodes The following describes in detail suitable apparatus and possible mechanisms for a video/image encoding process according to embodiments. In this regard reference is first made to FIG. 1 and FIG. 2, where FIG. 1 shows an example block diagram of an apparatus 50. The apparatus may be an Internet of Things (IoT) apparatus configured to perform various functions, such as for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The electronic device 50 may for example be a mobile terminal or user equipment of a wireless communication system, a sensor device, a tag, or other lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the examples described herein the display may be any suitable display technology suitable to display an image or video. The apparatus 50 may further comprise a keypad 34. In other embodiments of the examples described herein any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the examples described herein may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
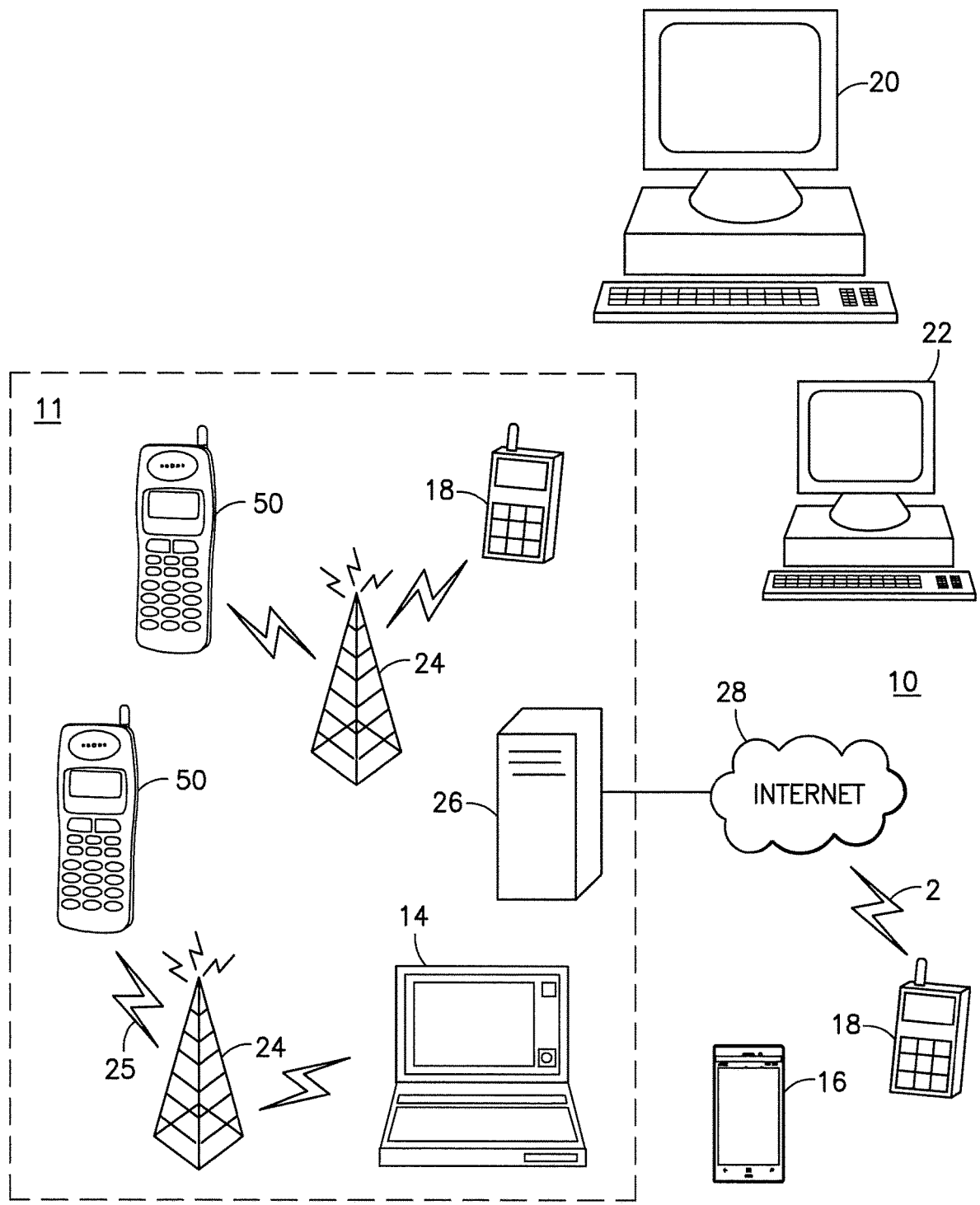
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types. Interface 2 is configured to provide access to the internet 28, for example for integrated messaging device (IMD) 18.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and may enable many fields of embedded systems, such as wireless sensor networks, control systems, home/building automation, etc. to be included the Internet of Things (IoT). In order to utilize Internet IoT devices are provided with an IP address as a unique identifier. IoT devices may be provided with a radio transmitter, such as WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
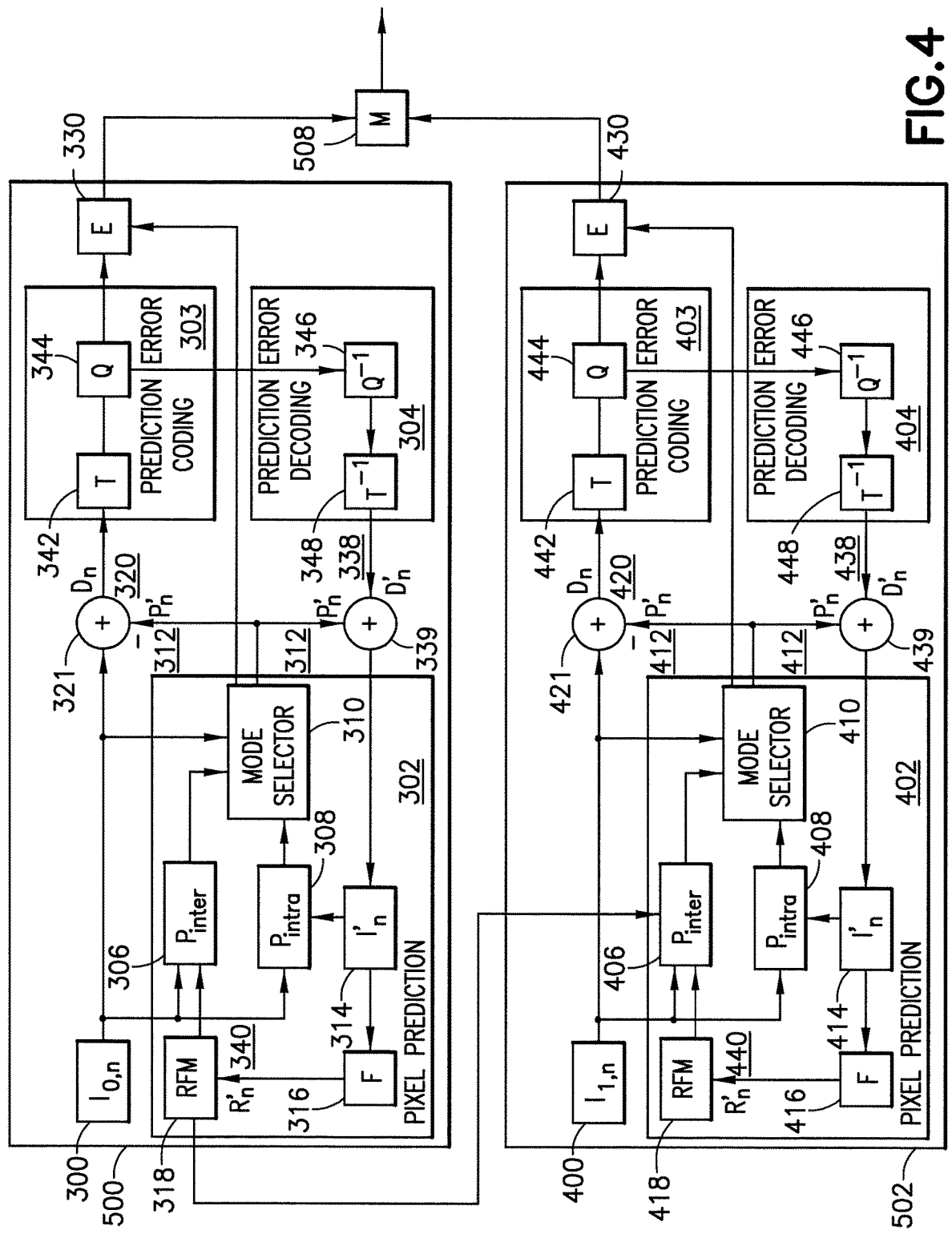
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, e.g. DCT coefficients, to reconstruct the transform signal and an inverse transformation unit 348, 448, which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Figure 5:
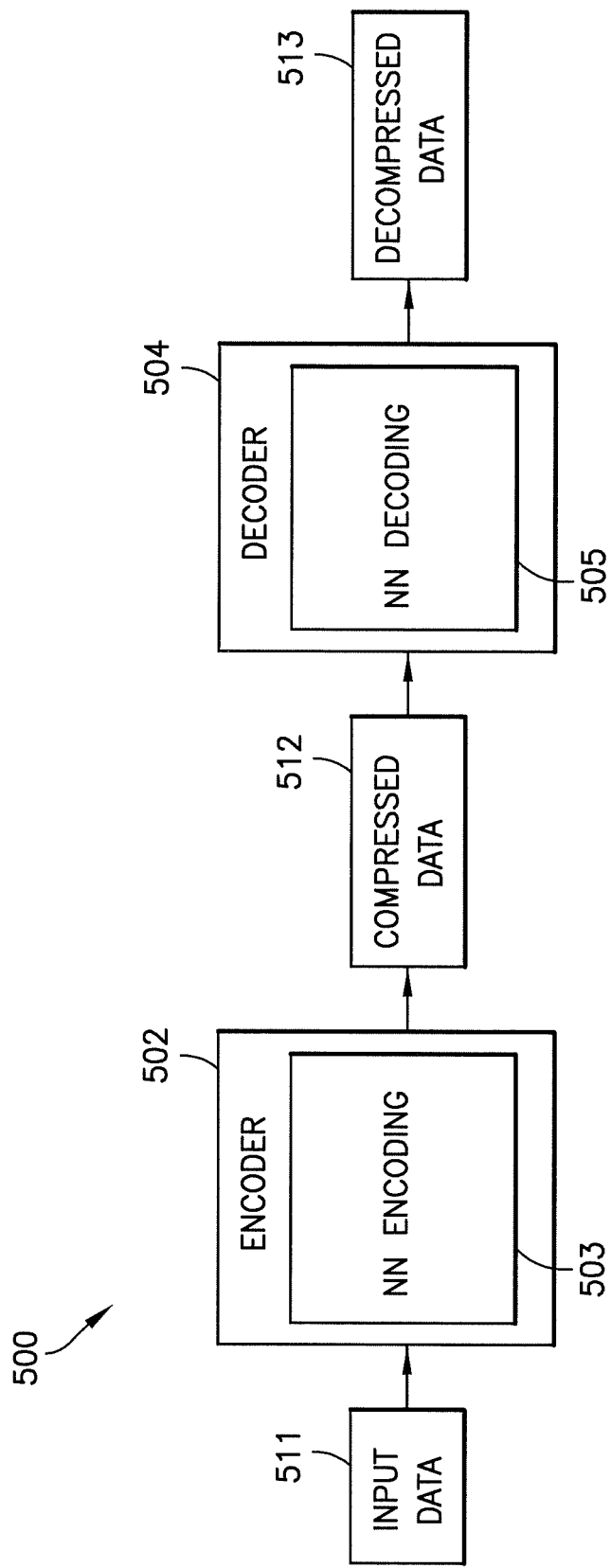
FIG. 5 is a block diagram showing the interface between an encoder and a decoder in accordance with the examples described herein.

FIG. 5 is a block diagram 500 showing the interface between an encoder 502 implementing neural network encoding 503, and a decoder 504 implementing neural network decoding 505 in accordance with the examples described herein. The encoder 502 may embody a device, software method or hardware circuit. Encoder 502 has the goal of compressing input data 511 (e.g., an input video) to compressed data 512 (e.g., a bitstream) such that the bitrate is minimized and the accuracy of an analysis or processing algorithm is maximized. To this end, encoder 502 uses an encoder or compression algorithm, for example to perform neural network encoding 503.

The general analysis or processing algorithm may be part of decoder 504. Decoder 504 uses a decoder or decompression algorithm, for example to perform neural network decoding 505 to decode the compressed data 512 (e.g., compressed video) which was encoded by encoder 502. Decoder 504 produces decompressed data 513 (e.g. reconstructed data).

Encoder 502 and decoder 504 may be entities implementing an abstraction, may be separate entities or the same entities, or may be part of the same physical device.

The analysis/processing algorithm may be any algorithm, traditional or learned from data. In the case of an algorithm which is learned from data, it is assumed that this algorithm can be modified or updated, for example using optimization via gradient descent. One example of the learned algorithm is a neural network.

ISO base media file format. Available media file format standards include ISO base media file format (ISO/IEC 14496-12, which may be abbreviated ISOBMFF), MPEG-4 file format (ISO/IEC 14496-14, also known as the MP4 format), file format for NAL (Network Abstraction Layer) unit structured video (ISO/IEC 14496-15) and 3GPP file format (3GPP TS 26.244, also known as the 3GP format). ISOBMFF is the base for derivation of all the above mentioned file formats (excluding the ISOBMFF itself).

Some concepts, structures, and specifications of ISOBMFF are described below as an example of a container file format, based on which the embodiments may be implemented. The aspects of the examples described herein are not limited to ISOBMFF, but rather the description is given for one possible basis on top of which the examples described herein may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO base media file format, a file includes media data and metadata that are encapsulated into boxes. Each box is identified by a four character code (4CC) and starts with a header which informs about the type and size of the box.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited to the use cases mentioned above to be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments may follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification.

A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

A media segment may comprise one or more self-contained movie fragments. A media segment may be used for delivery, such as streaming, e.g. in MPEG-DASH.

The track reference mechanism can be used to associate tracks with each other. The TrackReferenceBox includes box(es), each of which provides a reference from the containing track to a set of other tracks. These references are labelled through the box type (i.e. the four-character code of the box) of the contained box(es).

The ISO Base Media File Format contains three mechanisms for timed metadata that can be associated with particular samples: sample groups, timed metadata tracks, and sample auxiliary information. A derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

MPEG Compressed Representation of Neural Networks standard (MPEG NNR—ISO/IEC 15938-17) aims to provide a standardized way to compress and distribute "neural networks" (from now on referred to as NNs). This is an important aspect in the era of AI-enabled IoT (AIoT) devices and ecosystems where billions of connected internet of things devices may be smart and have AI components (e.g. connected cars, home automation systems, smartphones, cameras, etc.).

Several "exchange formats" are defined by the industry. ONNX (https://onnx.ai/) or NNEF (https://www.khronos.org/nnef) could be listed as the two most well-known ones. However, they lack any compression aspect of neural networks, nor do they define a flexible and well-structured high level syntax for such compressed NN data. They provide topology information and links from topology elements to neural network weights and/or coefficients.

MPEG NNR has the following use cases which need to be addressed by a possible high-level bitstream syntax in general:

Transfer of whole or partial neural networks (e.g. layer by layer)

Partial update of a neural network in time

Provision of information about certain characteristics of compressed neural network (e.g. accuracy, compression method, compression ratio, etc.)

Access to the compressed neural network representation in a progressive manner

Re-usable weights or portions of neural network (in many cases, only the initial layers of a neural network are used, such as when that neural network is used only as a feature extractor and the extracted features are used by other neural networks or other neural networks' portions).

Retraining and federated learning of neural networks

The examples described herein introduce a high-level syntax for MPEG NNR compressed neural networks. It provides granular access to relevant NN information, at layer or sub-layer (i.e. filters, kernels, biases and alike) granularity. It also enables transmission of compressed NN representation over a communication channel, as well as partial update of a compressed neural network. It can also be used together with existing exchange formats in order to provide a compressed representation of neural network weights and coefficients.

The examples described herein improve exchangeability and storage of compressed NNs. The examples described herein also improve decoder side operations by providing a well-defined high-level syntax for compressed NN information exchange.

The examples described herein define a high-level bitstream syntax for compressed NNs which is comprised of the following logical concepts:

Compressed NN global metadata signaling
NN topology level metadata signaling
NN quantization parameters signaling
Compressed NN data related metadata signaling
Compressed NN data signaling An elementary bitstream syntax is defined. This bitstream is initiated by a global metadata which spans the whole compressed NN. The bitstream is comprised of information units which contain metadata and/or compressed neural network data of a particular portion of the overall neural network. This partitioning is done in relation to the NN topology information with a granularity down to a uniquely identifiable portion of a NN (layer, filter, kernel, etc.).

Some novel aspects of the examples described herein could be listed as a method comprising:

Signaling of a neural network's computation structure information (i.e. topology and quantization)
Signaling of a neural network's global information as metadata. Such metadata may contain NN type information, compressed representation information, compressed representation accuracy information, etc.
Partitioning of a neural network into independently or dependently decodable units
Signaling of the partition information as well as metadata related to the partitioned units
Signaling relational information about the partitioned neural network units to neural network's structure information
Storage of encoded representation of partitioned neural network units and related metadata for decoding such units A (quantized) neural network (NN) is usually represented by the following information:

General level parameters of a neural network
Topology of the network with unique identifiers to different elements of topology
(if quantized neural network's weights) Information about the quantization
Variables which represent the topology elements and their corresponding data types Exchange formats such as NNEF define the above-mentioned information and store them in files in a pre-determined directory tree structure.

In the examples described herein, such data structure is defined independent of the underlying file storage mechanism, but in an interoperable way so that such exchange mechanisms can make use of the compressed NN bitstream and convert it to their own data and storage structures.

Figure 6:
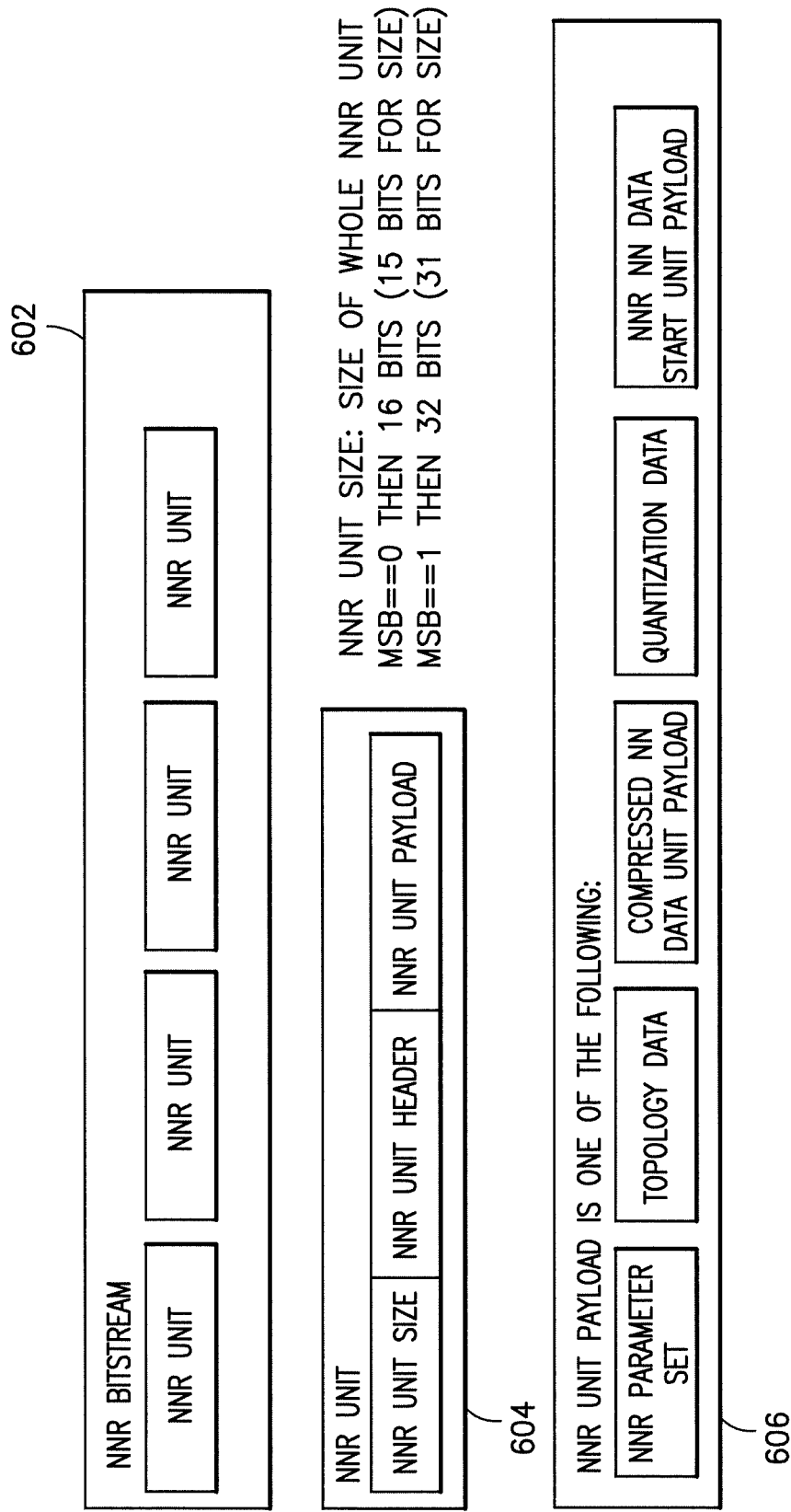
FIG. 6 shows an example structure of a compressed neural network (NNR) bitstream.

The compressed NN bitstream (to be called NNR bitstream from now on) has a structure as shown in FIG. 6.

NNR bitstream 602 is comprised of NNR Units. An NNR unit 604 may be comprised of the following information:

NNR Unit Size: This information may signal the total byte size of the NNR Unit. This field may be 16 bits or 32 bits in size which may be indicated by the most significant bit (MSB) of the first byte.

NNR Unit Header: This field may contain information about the type of the data carried in the payload, general metadata of the NNR unit being carried, etc. In the following sections, a more complete list of such metadata element is given.

NNR Unit Payload: It carries compressed or uncompressed NN related data. Such data may be one of the following: NNR parameter set (i.e. NN global information), topology data, quantization data or compressed/uncompressed NN data.

NNR Units may be concatenated to form a serialized bitstream which may represent the NN. An NNR encoder may generate such a serialized bitstream. This bitstream is then carried to the decoder for decoding, over a transmission channel.

In another embodiment, such an NNR bitstream may be stored as a file in a virtual or non-virtual directory tree structure. For example, NNEF may be utilized to carry compressed NN data. In such case, NN variables may be compressed using NNR encoding, stored as NNR bitstream into a file in a pre-determined directory structure.

In some embodiments, topology data, quantization data and compressed NN data can be full or partial; meaning that the data is either in a single NNR unit or partitioned into multiple NNR units. In the latter case, the NNR unit header may contain information to indicate such partial storage. This information may be represented by a counter which counts backwards in order to indicate the number of partitions used. For example, if the data is partitioned into 2 NNR units, the first NNR unit would contain counter number 2 and the second one may contain counter number 1. In another embodiment, the counter may represent one value less than the number of partitions.

In another embodiment, a flag in the NNR unit header may indicate partitioning and another flag may indicate the last NNR unit which belongs to the partitioned data.

In another embodiment, partitioned NNR units may have the same identifiers in their NNR unit header which may indicate the NN level information that the partition belongs to. This may be a unique id, unique string, a relative or absolute URI or URL or alike.

If topology information is partitioned, then multiple topology data NNR units may come together to form the final NN topology. NN Compressed Data Unit (NDU) payload may belong to the whole neural network, whole layer or portions of them.

The variables/weights in NN Compressed Data Unit payload may be mappable to topology elements via unique references or labels. Such data may be carried in the NNR NDU unit headers (i.e., in the NNR Unit Header of the NNR unit whose payload contains compressed data). This data may be a unique id, unique string, a relative or absolute URI or URL or alike.

Each NNR Unit Header may contain information about the type of the data in the NNR unit data payload 606. The following table may be given as an example of such data units and their enumerated data values:

| NNR Unit Type | Type identifier | Type enumeration (may be 1 byte) |
|---|---|---|
| NN-level parameter set data unit | NNR_NPS | 0x01 |
| NN Topology or graph data unit | NNR_TPL | 0x02 |
| NN quantization data unit | NNR_QNT | 0x03 |
| NN Compressed data unit | NNR_NDU | 0x04 |
| NN Compressed network data start unit | NNR_STR | 0x00 |
| Reserved | | 0x05-0xFF |

In the above table, enumerations, types and identifiers are given only as examples, and other values may be utilized.

Figure 7:
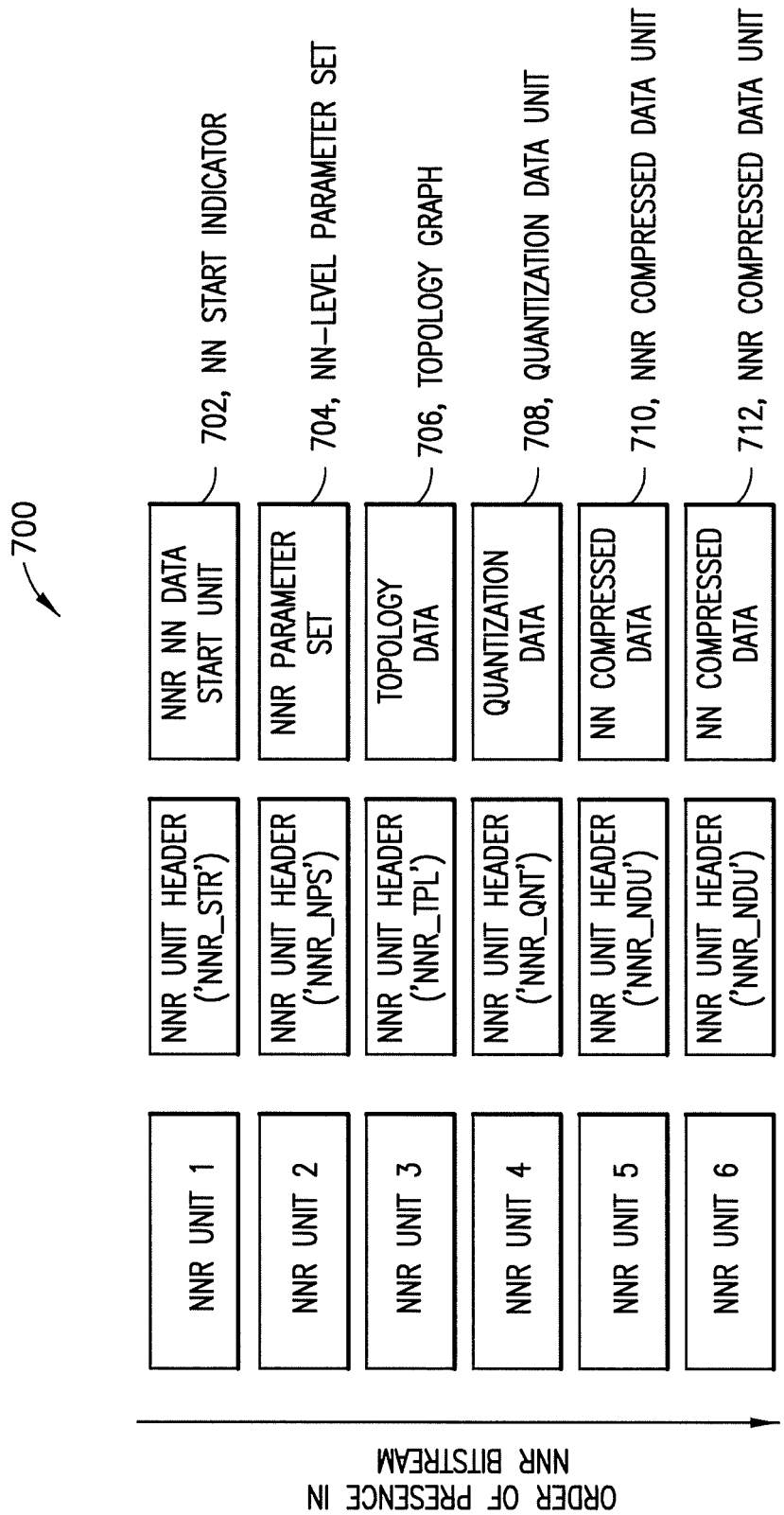
FIG. 7 is an example diagram showing how an NNR bitstream may be comprised of several NNR units of different types.

FIG. 7 is an example diagram 700 showing how an NNR bitstream may be comprised of several NNR units (e.g., NNR Units 1 through 6) of different types.

The order of presence of units may differ and may be a choice of the NNR encoder and content creator. NNR Start unit 702 may not be present in situations where NN data start can be deduced by other means (e.g. file storage, storage format indication, etc.). In another embodiment, NNR Start unit 702 may have a payload with a fixed or varying number of bytes which may indicate a start code. Refer to reference number 606 of FIG. 6 ("NNR NN Data Start Unit Payload").

NNR NN-level Parameter Set. NNR Parameter Set payload 704 may be comprised of whole or a subset of the following information:
1. Indicator whether the bitstream carries the topology internally as a data unit or it provides a reference/URL/Id for the topology.
2. Accuracy and other performance measures of the model [test-accuracy, test-dataset-ID/URL, bitrate, etc.]. This information may be utilized by the server and client side if a server has a set of pre-compressed models, and based on client's request, the server chooses the closest matching compressed NN model.
3. Additionally, from information in previous field (5), the server may generate a manifest, to be sent to the client, and it's then the client who chooses its preferred compressed model.
4. Update indicator (is it an update to the NN)
5. Update reference: baseline NN version on top of which to apply the weight-update. This may be a unique NN version ID.
6. Sparsification indicator (may be a single bit), indicating whether sparsification was performed.
7. Sparsification indicator tensor (indicating which units or weights are zero)
8. Quantization indicator (may be a single bit), indicating whether quantization was performed.
9. Quantization step-size (if scalable uniform quantization is used)
10. Quantization map
11. Max memory size required at decoder side (This is typically related to the biggest layer and output activations): some examples may be the max number of fully-connected parameters in a layer, the max number of convolutional parameters in a layer, etc.
12. Network-level priority information (mapping decoder-side compression parameters to resulting performance measures at a more granular level. For example, in the case of a classifier, how each class is affected by certain sparsification thresholds.
13. Network-level entropy information, such as entropy model and context model. This may be an ID specifying one of the context models available at decoder side.
14. Info about input type (e.g., media type; required input size; range; normalization; numerical precision; etc.)

As an example, the following NNEF model can be NNR encoded with a header as shown in FIG. 8. In particular, FIG. 8 shows an example topology description 800 of AlexNet which is in neural network exchange format (NNEF) topology graph format.

The corresponding NNR Network Parameter Set NNR Unit 704 may be defined as follows:
NNR Unit Header: "NNR_NPS"
Payload:
1. [File carries the topology explicitly vs as an ID?] 1
2. [Accuracy and other performance measures of the model: test-accuracy, test-dataset-ID/URL, bitrate] ACC=37%, dataset=www.imagenet.com/1234, file_size=23 MB
3. [Update flag] 0
4. [Update reference: baseline NN version on top of which to apply the weight-update. This can be a unique NN version ID] 0
5. [Sparsification flag] 0
6. [Sparsification indicator tensor (indicating which units or weights are zero)] 0 (this may be included into the NNR-units, per layer)
7. [Quantization flag] 0
8. [Quantization step size (if scalable uniform quantization)]: None
9. [Quantization map (if codebook-based non-uniform quantization)]: dict(0: 0.2, 1: 0.77, 2: −0.8, . . . )
10. [Max memory size required at decoder side: max num of fully-connected parameters, max num of convolutional parameters] 12345, 54321
11. [Network-level further sparsification at decoder-side (mapping sparsification threshold to resulting performance measures)] dict(0.01: 37, 0.05: 40, 0.1: 49)
12. [Network-level priority information (mapping decoder-side compression parameters to resulting performance measures at a more granular level)] dict(0.01: dict(class1: 35, class2: 20, class3: 54, class4: 43), 0.05: dict(class1: 50, class2: 25, class3: 43, class4: 35), 0.1: dict(class1: 40, class2: 60, class3: 54, class4: 36))
13. [Network-level entropy information, such as entropy model and context model] context_model_3
14. [Info about input type (e.g., media type; required input size and shape; range; normalization; numerical precision; etc.)] "image", [3,224,224], 0-255, dict("mean": [0.47, 0.47, 0.47,], "variance": [0.5, 0.5 0.5]), 24 bits.

NNR_NPS NNR Unit payload may be formatted to include fixed and variable length information for each of the above-mentioned information elements.

NNR Topology Data Unit. An NNR Topology Data Unit 706 may contain the following information in the NNR Unit Header:
NNR Unit Type as NNR_TPL
Topology format enumeration as NNEF: This field may indicate the actual format of the stored topology information. Possible values may be as given in the table below:

| Topology format | Type identifier | Type enumeration (may be 1 byte) |
| --- | --- | --- |
| NNEF format | NNR_NNEF | 0x01 |
| ONNX format | NNR_ONNX | 0x02 |
| MPEG defined format | NNR_MPEG | 0x03 |
| reserved | | 0x04-0xFF |

Whether or not topology is further compressed. This information may contain an enumeration of the following compression indicators:

| Compression scheme used | Type identifier | Type enumeration (may be 1 byte) |
| --- | --- | --- |
| Uncompressed | NNR_RAW | 0x00 |
| Deflate as defined in RFC 1950 | NNR_DFL | 0x01 |
| LZMA | NNR_LZMA | 0x02 |
| LZMA2 | NNR_LZMA2 | 0x03 |
| LZO | NNR_LZO | 0x04 |
| LZW | NNR_LZW | 0x05 |
| reserved | | 0x06-0xFF |

Partial information flag: indicating that the information in this data unit is partial Last partial data flag: indicating that this is the last data unit of a partial information. Alternatively, Counter: indicating the index of the partial information. A value of 0 indicates no partial information, a value bigger than 0 indicates the index of the partial information. This counter may count backwards to indicate initially the total number of partitions.

NNR Data Unit Payload may contain topology data unit in compressed or uncompressed format or in partitioned or non-partitioned format; as indicated in the NNR Unit Header data.

NNR Quantization Data Unit. This data unit 708 may contain the same type of a header as in NNR topology Data units but with the data unit type marked as "NNR_QNT". It may contain the same fields as defined above. NNR Data Unit Payload may contain quantization data in compressed or uncompressed format or in partitioned or non-partitioned format; as indicated in the NNR Unit Header data. An example of quantization data is a dictionary or look-up table mapping quantized values to dequantized values.

NNR Compressed NN Data Unit. NNR compressed data units (NDUs, which may also be named as CDUs) 710 and 712 may contain full or partial information which belong to data elements of an NN topology or graph.

NDUs may be identified by the NNR Unit Headers containing the type "NNR_NDU". NDU's NNR Unit Header may contain a subset or all of the following information:

1. NDU number or identifier
2. Elements of NDU active/disabled
3. NDU-specific quantization map. If empty, NN-level quantization maps could be utilized.
4. NDU-wise priority information (mapping decoder-side compression parameters to resulting performance measures). The priority information may be a relative priority information between different NDUs.
5. 1 bit: Flag to indicate if the matrix is decomposed
6. Additional info about decomposed matrices
7. NDU-level entropy information, such as entropy model and context model.
8. A flag to indicate independently decodable NDU
9. Array of unique identifiers to map elements in the NDU to topology elements (e.g. in NNEF case this is the list of labels present in the NDU)
10. NDU counter: backwards count of number of related NDUs (e.g. partially carried NN encoded variables): Default may be 0

As a payload, NNR compressed full or partial data may be carried.

Using the same example of AlexNet as above, several variables could be stored in the NNR NDU as follows. In this implementation example, NNR NDU Unit:

Header: "NNR_NDU", base_id="alexnet_v2/conv1/", id_list={['kernel', enum(type)], ['bias', enum (type)] }// . . . enum(type) corresponds to one of supported data types such as float32, float64, int16, int32, uint16, int16, int8, uint8, etc.

Additional information in the header are:

1. [NDU number] 1
2. [NDU active vs disabled] 0
3. [NDU-specific quantization map. If empty, use NN-level quantization map.] empty
4. [NDU-wise priority information (mapping decoder-side compression parameters to resulting performance measures)] 1
5. [Was the matrix decomposed?] 0
6. [Additional info about decomposed matrices] None
7. [NDU-level entropy information, such as entropy model and context model.] context_model_3
8. [Independently decodable NDU flag] 1
9. NDU counter: 0 (alternatively, NDU Partial_Flag=False, NDU Last Flag=False)

Payload: NNR Compressed representation of variables as listed in the ID/label array of the header.

base_id indicates the base identifier for different NN variables in the payload. id_list contains variable id, type pairs.

NNR Bitstream High Level Syntax. Data structures and information in the section below are given as examples and their names and values may change. Their order or cardinality in the high-level syntax may also differ in different implementations.

Bitstream type descriptors: The following descriptors specify the parsing process of each syntax element:

b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

i(n): signed integer using n bits. When n is "v" in the syntax table, the number of bits varies in a manner dependent on the value of other syntax elements. The parsing process for this descriptor is specified by the return value of the function read_bits(n) interpreted as a two's complement integer representation with most significant bit written first. In particular, the parsing process for this descriptor is specified as follows:

```
i(n) {
    value = read_bits( n)
    if( value < ( 1 << ( n − 1 )))
        return value
    else
        return ( value | ~(( 1 << (n − 1))−1 )
}
``` st(v): null-terminated string encoded as UTF-8 characters as specified in ISO/IEC 10646. The parsing process is specified as follows: st(v) begins at a byte-aligned position in the bitstream and reads and returns a series of bytes from the bitstream, beginning at the current position and continuing up to but not including the next byte-aligned byte that is equal to 0x00, and advances the bitstream pointer by (stringLength+1)*8 bit positions, where stringLength is equal to the number of bytes returned. The st(v) syntax descriptor is only used when the current position in the bitstream is a byte-aligned position.

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with the most significant bit written first.

ue(v): unsigned integer 0-th order Exp-Golomb-coded syntax element with the left bit first.

Byte Alignment: In the following data structures, byte aligned data structures are assumed. In order to enable such alignment, byte_alignment( ) data structure is appended to the other data structures.

| byte_alignment ( ) { | Descriptor |
|---|---|
| alignment_bit_equal_to_one /* equal to 1 */ | f(1) |
| while ( !byte_aligned ( ) ) | |
| alignment_bit_equal_to_zero /* equal to 0 */ | f(1) |
| } | |

NNR Bitstream: The following data structures are newly defined in the context of compressed neural networks high level bitstream syntax.

NNR Unit Syntax: An NNR unit is comprised of a size information, a header information and a payload information.

| nnr_unit (numBytesInNNRUnit) { | Descriptor |
|---|---|
| nnr_unit_size ( ) | |
| nnr_unit_header ( ) | |
| nnr_unit_payload ( ) | |
| while ( more_data_in_nnr_unit ) | |
| trailing_zero_8bits /* equal to 0x00 */ | f 8) |
| } | | more_data_in_nnr_unit( ) is specified as follows:
If more data follow in the current nnr_unit, i.e. the decoded data up to now in the current nnr_unit is less than numBytesInNNRUnit, the return value of more_data_in_nnr_unit( ) is equal to TRUE.
Otherwise, the return value of more_data_in_nnr_unit( ) is equal to FALSE.

In some embodiments, each information inside the NNR Unit may have its size information. In another embodiment, only a subset of such information may be present in an NNR unit. In another embodiment, each NNR Unit may have a start code and an end code for marking the beginning and end of such NNR units. A start code may be a pre-defined bit pattern. The bitstream syntax may be such that start codes are identifiable, i.e. a start of an NNR unit could be find be searching for the bit pattern of the start code from the bitstream.

NNR Unit Size Syntax: NNR unit size may indicate the total size of the NNR unit in bytes. It may provide the whole size information of the NNR unit, including the nnr_unit_size( ). In some embodiments, it may only indicate the size of the header and the payload.

| nnr_unit_size ( ) { | Descriptor |
|---|---|
| nnr_unit_size_flag | u(1) |
| nnr_unit_size | u(15 + nnr_unit_size_flag*16) |
| } | | nnr_unit_size_flag indicates the number of bits used as the data type of the nnr_unit_size. If this value is 0, then nnr_unit_size is a 15 bits unsigned integer value, otherwise it is 31 bits unsigned integer value. In another embodiment, nnr_unit_size_flag may be mandatorily set to 0 for some of the NNR unit types, such as NR units of type "NNR_STR" (NN start indicator).

NNR Unit Header Syntax: NNR Unit Header may provide information about the NNR unit type and additional related metadata.

| nnr_unit_header ( ) { | Descriptor |
|---|---|
| nnr_unit_type | u(8) |
| If (nnr_unit_type == NNR_NPS) | |
| nnr_parameter_set_unit_header ( ) | |
| If (nnr_unit_type == NNR_TPL) | |
| nnr_topology_unit_header ( ) | |
| If (nnr_unit_type == NNR_QNT) | |
| nnr_quanization_unit_header ( ) | |
| If (nnr_unit_type == NNR_NDU) | |
| nnr_data_unit_header () | |
| If (nnr_unit_type == NNR_STR) | |
| nnr_start_header ( ) | |
| byte_alignment ( ) | |
| } | | nnr_unit_type may indicate the type of the NNR unit. The following NNR units may be defined.

| NNR Unit Type | Type identifier | Value |
|---|---|---|
| NN-level parameter set data unit | NNR_NPS | 0x01 |
| NN Topology or graph data unit | NNR_TPL | 0x02 |
| NN quantization data unit | NNR_QNT | 0x03 |
| NN Compressed data unit | NNR NDU | 0x04 |
| NN Compressed network data start unit | NNR_STR | 0x00 |
| Reserved | | 0x05-0xFF |

It must be noted the table above is an example and more NNR data units may be defined. Moreover, the type identifiers and values are given as an example and other identifiers and values may be defined. In another embodiment, nnr_unit_type may be defined with number of bits less than 8. In all examples below "(count−1)" may be replaced with a variable which may be called "countMinusOne" or similar, which may indicate one less value of the count variable.

NNR Parameter Set Unit Header. An example syntax for nnr_parameter_set_unit_header( ) is given below.

| nnr_parameter_set_unit_header ( ) { | Descriptor |
|---|---|
| topology_flag | u(1) |
| nn_update_flag | u (1) |
| If (update_flag) | |
| update_nn_id | u(8) or st(v) |
| nn_id | u(8) or st(v) |
| sparsification_flag | u(1) |
| sparsification_tensor ( ) | |
| quantization_flag | u(1) |
| decomposition_flag | u(1) |
| quantization_step_size | u(8) |
| quantization_map ( ) | |
| max_memory_requirement | u(32) |
| sparsification_performance_map ( ) | |
| priorty_map ( ) | |
| nn_entropy_information ( ) | |
| nn_input_type_information ( ) | |
| accuracy_information ( ) | |
| byte_alignment ( ) | |
| } | | topology_flag may indicate the presence of the topology information in the NN high level syntax bitstream. When set to 1, it may indicate that topology is in the bitstream and carried with NNR unit types "NNR_TPL". If 0, then it may mean that topology is externally referenced via an Id, a URI, URL or alike.

nn_update_flag when set to 1 indicates that the NNR Units may be used for partial update of a previous NN with id update_nn_id.

nn_id (and update_nn_id) is a unique identifier of the NNR encoded NN. In another embodiment, this field may be a null-terminated string which may contain an absolute or relative URI or URL, or a unique string. In NNEF context, this string reference may correspond to one or more NNEF variables which are saved as ".dat" files.

sparsification_flag when set to 1 indicates that sparsification is applied on the NN.

sparsification_tensor( ) contains information about which units or weights are 0. It may have the following syntax:

| sparsification_tensor ( ) { | Descriptor |
|---|---|
| compressed_flag | u(1) |
| if (compressed_flag) | |
| compression_format | u(8) |
| sparsification_data ( ) | ue(v) |
| byte_alignment ( ) | |
| } | |

In sparsification_tensor( ): compressed flag indicates whether a compression is applied on the sparsifiction_data( ). compression_format enumerates the compression algorithm applied for compressing the sparsification_data( ). In another embodiment, there may be a well-defined order in the sparsification data representation which maps to the order of the weights directly. In another embodiment, sparsification_tensor( ) may be present in the NNR unit payload of NNR units.

decomposition_flag when set to 1 indicates that at least one of NN compressed data units contains decomposed matrices. quantization_flag may indicate the presence of quantization information. quantization_step_size may indicate a step interval for scalar uniform quantization.

quantization_map( ) may signal a code-book based non-uniform quantization scheme. It may have syntax as follows:

| quantization_map ( ) { | Descriptor |
|---|---|
| compressed_flag | u(1) |
| if (compressed_flag) | |
| compression_format | u(8) |
| quantization_map_data ( ) | ue(v) |
| byte_alignment ( ) | |
| } | | quantization_map_data( ) may be an array (e.g. a dictionary) of the form {[index<integer>:value<float>]} where index may be a quantized value indicator and the second value may be a signed float value corresponding to that quantized value index. In another embodiment, each index may indicate a range of quantization steps. In another embodiment, the types of these values may be 8-bit, 16-bit, 32-bit or 64-bit floating-point values. In another embodiment, quantization map may be carried in the NNR unit payload of the NNR unit.

max_memory_requirement may indicate the value for the maximum memory needed by the NNR decoder or inference device for running the neural network. In one embodiment, this value may be indicated as a concatenation of two values: maximum number of fully-connected parameters and maximum number of convolutional parameters in a layer or in part of a layer (such as in a convolution kernel). In another embodiment, this value may be indicated as a 64-bit value and it may be an unsigned integer or float casted to unsigned integer.

sparsification_performance_map( ) may signal a mapping between different sparsification thresholds and resulting NN inference accuracies based on a selected accuracy reporting scheme. In the following example, accuracy is a value between 0 and 100, where threshold is a floating point value.

| sparsification_performance_map ( ) { | Descriptor |
|---|---|
| count | u(8) |
| for (j = 0; j < (count−1); j++ ) { | |
| sparsification_threshold | f(32) |
| nn_accuracy | u(8) |
| } | |
| dataset_id ( ) | |
| byte_alignment ( ) | u(8) |
| } | | count may signal the number of information tuples present in the data structure. In another embodiment, sparsification_performance_map( ) may be carried in the NNR unit payload of the NNR unit. sparsification_threshold may signal the sparsification threshold value; when applied to the weighs (i.e. zeroing the weights or parameters which are below the sparsification_threshold); results in an inference accuracy of nn_accuracy (in a scale of 0 to 100). In another embodiment, nn_accuracy is a relative value among the listed entries in the data structure.

dataset_id( ) may provide information about which dataset(s) and which version of the dataset(s) were used in computing the performance measurements. In another embodiment, this data structure may be present in the NNR_NDU units' header or payload as well, in order to indicate the accuracy levels of different thresholds when applied to the data structures inside the NNR Compressed Data Unit.

In another embodiment, sparsification_performance_map( ) may contain the task-dependent performance of a model (e.g. accuracy in classification or PSNR in image compression), the performance degradation or gain with respect to the original non-sparse model and the compression ratio obtained by employing the sparsification to the model in terms of non-zero ratio.

accuracy_information( ) may provide information about the accuracy of the compressed NN on different datasets.

| accuracy_information ( ) { | Descriptor |
|---|---|
| count | u(8) |
| for(j = 0; j < (count − 1); j++ ) { | |
|    dataset_information | st(v) |
|    nn_dataset_accuracy | u(8) |
| } | |
| byte_alignment ( ) | |
| } | | dataset_information is an absolute or relative URI or URL of the dataset against which the accuracy was calculated. nn_dataset_accuracy is an accuracy value between 0 and 100. In another embodiment, nn_accuracy is a ratio between the uncompressed and compressed NN accuracy when tested against the dataset. In such a case, this value may be signalled as a floating point value.

priority_map( ) may signal information about how different aspects of a neural network performance are affected by some of the compression parameters (such as sparsification with different thresholds). For example, in the case of a classifier neural network, this information may comprise a dictionary or look-up table mapping a set of sparsification thresholds to sets of corresponding accuracies per class.

| priority_map( ) { | Descriptor |
|---|---|
| count | u(8) |
| for(j = 0; j < (count − 1); j++ ) { | |
|    compression_parameter | u(8) |
|    accuracies_per_aspect | u(8) |
| } | |
| dataset_id | u(8) |
| byte_alignment ( ) | |
| } | | compression parameter may signal one or more compression parameter values, such as sparsification threshold, or number of quantization points. In an embodiment, different compression_parameters may be applied to different components (e.g. variables) of NNs which are signalled in NDUs.

accuracies_per_aspect may signal information about the accuracy of the neural network when the compression_parameter is applied, in a per-aspect granularity, where an aspect of a neural network may be for example a class in the case of a classifier neural network (so, accuracies are provided for each class), or bounding-box size versus bounding-box center in the case of detector neural network (so, accuracies are provided separately for the bounding-box size and for the bounding-box center), etc.

dataset_id( ) may provide information about which dataset(s) and which version of the dataset(s) were used in computing the performance measurements.

nn_entropy_information( ) may signal information about which entropy model or context model to use at the decoder side, out of all available entropy models or context models.

| nn_entropy_information ( ) { | Descriptor |
|---|---|
| count | u(8) |
| for(j = 0; j < (count − 1); j++ ) { | |
|    entropy_model | u(8) |
|    context_model | u(8) |
| } | |
| byte_alignment( ) | |
| } | | nn_input_type_information( ) may signal information about the type of accepted input data, such as media type (image, audio frame, etc.), required size and shape for the input data structure, range, normalization method and parameters, numerical precision, etc.

| nn_input_type_information ( ) { | Descriptor |
|---|---|
| count | u(8) |
| for(j = 0; j < (count − 1); j++ ) { | |
|    media_type | u(8) |
|    required_size_and_shape | u(8) |
|    range | u(8) |
|    normalization | u(8) |
|    numerical_prediction | u(8) |
| } | |
| byte_alignment( ) | |
| } | |

NNR Topology Unit Header. This data structure signals the topology related header data.

| nnr_topology_unit_header( ) { | Descriptor |
|---|---|
| topology_storage_format | u(8) |
| topology_compressed_flag | u(1) |
| if(compressed_flag) | |
|    compression_format | u(8) |
| partial_flag | u(1) |
| last_flag | u(1) |
| counter | u(5) |
| byte_alignment( ) | |
| } | | topology_storage_format may indicate the actual format of the stored topology information. Possible values may be as given in the table below:

| Topology storage format | Type identifier | Type enumeration (may be 1 byte) |
|---|---|---|
| NNEF format | NNR_NNEF | 0x01 |
| ONNX format | NNR_ONNX | 0x02 |
| MPEG defined format | NNR_MPEG | 0x03 |
| reserved | | 0x04-0xFF | topology_compressed_flag may indicate whether or not topology is further compressed.

compression_format may contain an enumeration of the following compression indicators:

| Compression format | Type identifier | Type enumeration (may be 1 byte) |
|---|---|---|
| Uncompressed | NNR_RAW | 0x00 |
| Deflate as defined in RFC 1950 | NNR_DFL | 0x01 |
| LZMA | NNR_LZMA | 0x02 |
| LZMA2 | NNR_LZMA2 | 0x03 |
| LZO | NNR_LZO | 0x04 |
| LZW | NNR_LZW | 0x05 |
| reserved | | 0x06-0xFF | partial_flag may indicate that the information in this data unit is partial. last_flag may indicate that this is the last data unit of a partial information. counter may indicate the index of the partial information. A value of 0 indicates no partial information, a value bigger than 0 indicates the index of the partial information. This counter may count backwards to indicate initially the total number of partitions. In another embodiment, when counter is present in the data structure, partial_flag and last_flag may not be present. The vice-versa is also possible.

NNR Quantization Unit Header. This header information may be very similar to NNR Topology Unit Header.

| nnr_quantization_unit_header( ) { | Descriptor |
|---|---|
| quantization_storage_format | u(8) |
| quantization_compressed_flag | u(1) |
| if(compressed_flag) | |
|    compression_format | u(8) |
| partial_flag | u(1) |
| last_flag | u(1) |
| counter | u(5) |
| byte_alignment( ) | |
| } | | quantization_storage_format may have the same syntax and semantics as the topology_storage_format. quantization_compressed_flag may have the same syntax and semantics as the topology_compressed_flag.

NNR Compressed Data Unit Header. NNR Compressed Data Unit Header provides information about the NNR Compressed Data Unit which it precedes. Its data structure and semantics may be as follows:

| nnr_data_unit_header( ) { | Descriptor |
|---|---|
| base_id | st(v) |
| id_list( ) | u(1) |
| NDU_index | u(16) |
| NDU_active_flag | u(1) |
| NDU_quantizaton_map_flag | u(1) |
| If(NDU_quantization_map) | |
|   NDU_quantization_map( ) | |
| NDU_priorty( ) | |
| NDU_decomposed_flag | u(1) |
| If (NDU_decomposed_flag) | |
|   NDU_decomposition_information( ) | |
| NDU_entropy_information_flag | u(1) |
| If (NDU_entropy_information_flag) | |
|   NDU_entropy_information( ) | |
| NDU_independently_decodable_flag | u(1) |
| partial_flag | u(1) |
| last_flag | u(1) |
| counter | u(5) |
| byte_alignment( ) | f(8) |
| } | | base_id is a unique string which may be used to indicate a base URI, URL, root of directory tree structure or similar information. When concatenated with the id_list elements' id_name values, it provides a unique identifier for the compressed NN data unit elements. In NNEF context, this unique identifier may correspond to an NNEF variable which is saved as ".dat" files.

id_list may provide a list of uniquely identifiable neural network topology elements which are present in the compressed NN data unit.

| Id_list ( ) { | Descriptor |
|---|---|
| count | u(8) |
| for(j = 0; j < (count − 1); j++ ) { | |
|   id_name | st(v) |
|   data_type | u(8) |
|   data_size | u(32) |
| } | |
| byte_alignment( ) | |
| } | | count indicates the number of entities listed in the data structure. id_name provides a unique identifier for the compressed NN data unit element which may span a portion of the compressed data. In an embodiment, such an identifier may correspond to the variable identifiers in NNEF topology graph. The interpretation of this field may be dependent on the compressed data format (i.e. NNEF, ONNX, MPEG, etc.)

data_type may be an enumerated data type value. Possible values could be (but not limited to): binary, unit, int, float with 1 bit, 4 bit, 8 bit, 16 bit, 32 bit and 64 bit precisions. data_size may indicate the number of parameters or weights belong to this id when the compressed N data unit is uncompressed. In another embodiment, this value may indicate the byte size which corresponds to such parameters or weights.

NDU_quantization_map( ) may signal a code-book based non-uniform quantization scheme. It may have syntax as follows:

| NDU_quantization_map( ) { | Descriptor |
|---|---|
| compressed_flag | u(1) |
| if(compressed_flag) | |
|   compression_format | u(8) |
| quantization_map_data( ) | ue(v) |
| byte_alignment( ) | |
| } | | quantization_map_data( ) may be an array (e.g. a dictionary) of the form {[(index<integer>:value<float>)]} where index may be a quantized value indicator and the second value may be a signed float value corresponding to that quantized value index. In another embodiment, each index may indicate a range of quantization steps. In another embodiment, the types of these values may be 8-bit, 16-bit, 32-bit or 64-bit floating-point values.

NDU priority_map( ) may signal information about how different aspects of a neural network performance are affected by some of the compression parameters (such as sparsification with different thresholds or different level of precisions for quantization). For example, in the case of a classifier neural network, this information may comprise a dictionary or look-up table mapping a set of sparsification thresholds to sets of corresponding accuracies per class.

| NDU_priority_map( ) { | Descriptor |
|---|---|
| count | u(8) |
| for( j = 0; j < (count − 1); j++ ) { | |
| compression_parameter | u(8) |
| accuracies_per_aspect | u(8) |
| } | |
| dataset_id | u(8) |
| byte_alignment( ) | |
| } | | compression_parameter may signal one or more compression parameter values, such as sparsification threshold, or number of quantization points. accuracies_per_aspect may signal information about the accuracy of the neural network when the compression_parameter is applied, in a per-aspect granularity, where an aspect of a neural network may be for example a class in the case of a classifier neural network (so, accuracies are provided for each class), or bounding-box size versus bounding-box center in the case of detector neural network (so, accuracies are provided separately for the bounding-box size and for the bounding-box center), etc. dataset_id( ) may provide information about which dataset(s) and which version of the dataset(s) were used in computing the performance measurements.

NDU_entropy_information( ) may signal information about which entropy model or context model to use at decoder side, out of all available entropy models or context models. Context models may be used in the lossless coding steps (e.g. arithmetic coding) to estimate a probability of the next symbol to encode or decode.

| nn_entropy_information ( ) { | Descriptor |
|---|---|
| count | u(8) |
| for( j = 0; j < (count − 1); j++ ) { | |
| entropy_model | u(8) |
| context_model | u(8) |
| } | |
| byte_alignment( ) | |
| } | |

NDU_decomposition_information( ) may signal information about the decomposition method and its parameters, used for compressing the variable considered in this NNR Unit.

| NDU_decomposition_information( ) { | Descriptor |
|---|---|
| Count | u(8) |
| for( j = 0; j < (count − 1); j++ ) { | |
| decomposition_method | u(8) |
| NDU_decomposition_parameters( ) | |
| } | |
| byte_alignment( ) | |
| } | | decomposition_method signals information about the decomposition method. Its default value may be 0 to indicate non-usage of the field.

| NDU_decomposition_parameters( ) { | Descriptor |
|---|---|
| decomposition_parameters( ) | ue(v) |
| byte_alignment( ) | |
| } | | decomposition_parameters( ) signals information about specific parameters about the decomposition method specified by decomposition_method, and which are useful at decoder side for reconstructing the original data structure or which are useful for the inference process. Such information may contain dimensions of matrices resulting from decomposition.

NNR Start Unit Header. NNR start unit header may indicates the start of a compressed NN bitstream. It has a unique signature so that it can be identified when a bitstream is parsed from any bit index. In another embodiment, certain start code emulation prevention scheme may be applied to the NNR compressed bitstream so that this value is not emulated and present in the bitstream anywhere else. An emulation prevention scheme may for example add an emulation prevention byte into the bitstream in a byte location where a start code emulation would otherwise happen. In another embodiment, such an emulation prevention may be done for the whole bitstream value of NNR Unit size+NNR Unit Header+NNR Unit Payload. Such a value with the below defined nnr_start_code may be as follows: 0x000C00F0F0F0F0F0F0F0F0 (2 bytes size+1 byte unit type+8 bytes header data). In an embodiment, a decoder or another entity identifies NNR units e.g. from start codes, and subsequently removes start code emulation prevention from a NN bitstream or individual NNR units, e.g. by identifying which bytes where added to the bitstream to avoid start code emulations to happen and removing these bytes from the bitstream. The decoding of the NNR units may then be done without considering start code emulation bytes or alike intervening the syntax.

| nnr_start_unit_header( ) { | Descriptor |
|---|---|
| nnr_start_code | u(64) |
| } | | nnr_start_code may indicate the start of an NNR bitstream. The value may be a 64 bit value such as 0xF0F0F0F0F0F0F0F0. This value is given as an example and other values may be defined. NN start indicator NNR unit may not have an NNR data payload. In another embodiment, nnr_start_code may be stored as a payload and nnr_start_header may be empty.

NNR Unit Payload. An example syntax for nnr_unit_payload is provided below.

| nnr_unit_payload( ) { | Descriptor |
|---|---|
| If(nnr_unit_type == NNR_NPS) | |
| nnr_parameter_set_payload( ) | |
| If(nnr_unit_type == NNR_TPL) | |
| nnr_topology_unit_payload( ) | |
| If(nnr_unit_type == NNR_QNT) | |
| nnr_quanization_unit_payload( ) | |
| If(nnr_unit_type == NNR_NDU) | |
| nnr_data_unit_payload( ) | |
| If(nnr_unit_type == NNR_STR) | |
| nnr_start_unit_payload( ) | |
| byte_alignment( ) | |
| } | | nnr_parameter_set_payload( ) may be empty or filled with some of the data structures which were already defined in the NNR parameter set unit header.

nnr_topology_unit payload( ) may be a partial or full representation of the topology. It may be compressed or uncompressed. Its format is as defined in the NNR topology unit header. An NNR decoder is expected to provide this information to a higher level component after or before decompression. NNR decoder may not be expected to understand the data format of this structure, unless it is defined by the same entity which defines the NNR decoder.

nnr_quantization_unit_payload( ) may be a partial or full representation of the quantization parameters. It may be compressed or uncompressed. Its format is as defined in the NNR quantization unit header. An NNR decoder is expected to provide this information to a higher level component after or before decompression. NNR decoder may not be expected to understand the data format of this structure, unless it is defined by the same entity which defines the NNR decoder.

nnr_start_unit_payload( ) may be empty or it may contain he NNR start code as defined above.

nnr_data_unit_payload( ) is an NNR compressed data unit. Its compression scheme is as defined by the same entity which defines the NNR decoder. NNR compressed data units may be decodable alone or dependent on other compressed data units. NNR compressed data unit header information provides the necessary metadata regarding different characteristics of the compressed data unit.

NNR Decoding Process. An NNR decoder, when receiving an NNR encoded bitstream is expected to perform the following steps (the order of parsed elements may change):

1. Parse and check for the presence of the NNR Unit with type NNR_STR.
2. Once found the NNR_STR unit, start parsing the next NNR unit by reading the size of the unit, the header information and the payload.
3. Identify and parse the topology NNR units and provide the topology information to the decoding entity.
4. Identify and parse the quantization NNR units and provide the topology information to the decoding entity.
5. Identify and parse the NNR compressed data units and provide them to the NNR decoding process. Decoding may happen per unit bases or by combining multiple NNR units together.

In another embodiment, NNR decoder may simply start parsing the bitstream from the beginning without paying attention to the NNR start data unit. The presence of such a data unit may be signalled by other means to the NNR decoder.

In some embodiments of the examples described herein, the decoder may decide to perform (further) compression to the data of the neural network, based on the information provided via the disclosed high-level syntax. In particular, the priority information in the HLS is used to decide what compression parameter values to apply based on given requirements. Requirements may be for example an acceptable overall accuracy, or acceptable accuracies for a subset of classes (in the case of a classifier neural network).

Figure 9:
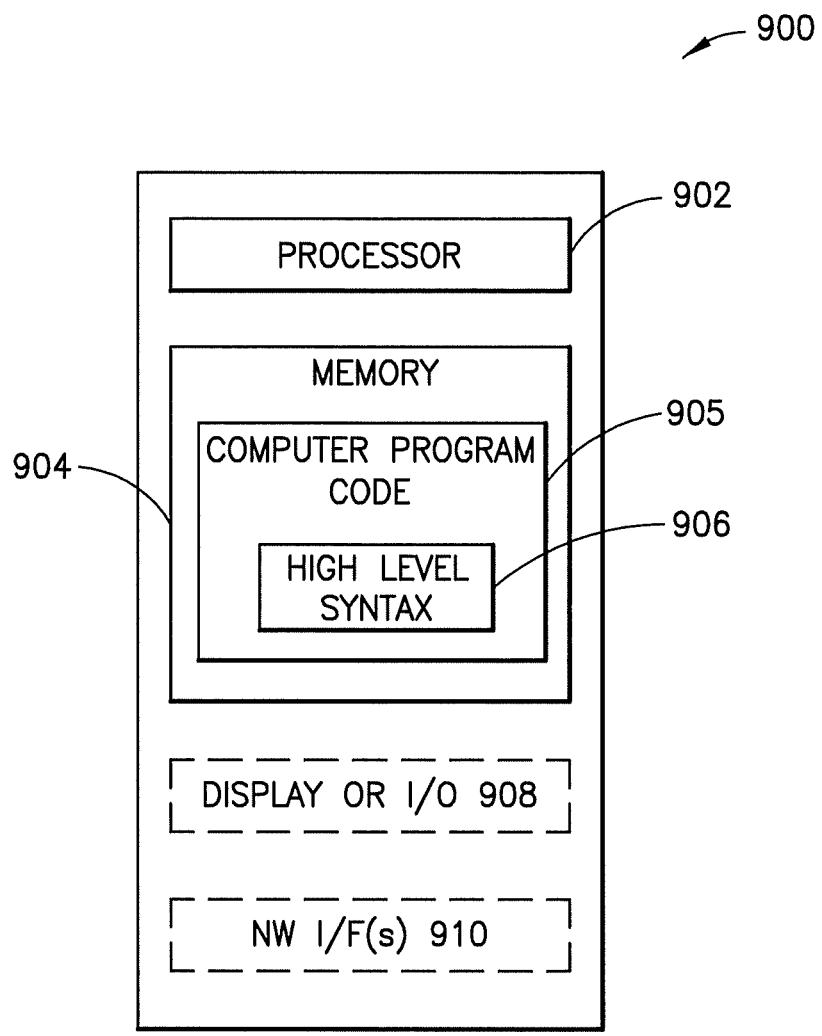
FIG. 9 is an example apparatus configured to implement high level syntax for a compressed representation of neural networks.

FIG. 9 is an example apparatus 900, which may be implemented in hardware, configured to implement high level syntax for a compressed representation of neural networks, based on the examples described herein. The apparatus 900 comprises a processor 902, at least one non-transitory memory 904 including computer program code 905, wherein the at least one memory 904 and the computer program code 905 are configured to, with the at least one processor 902, cause the apparatus to implement high level syntax 906 based on the examples described herein. The apparatus 900 optionally includes a display or I/O 908 that may be used to display content during rendering. The apparatus 900 optionally includes one or more network (NW) interfaces (I/F(s)) 910. The NW I/F(s) 910 may be wired and/or wireless and communicate over the Internet/other network(s) via any communication technique. The NW I/F(s) 910 may comprise one or more transmitters and one or more receivers. The N/W I/F(s) 910 may comprise standard well-known components such as an amplifier, filter, frequency-converter, (de)modulator, and encoder/decoder circuitry(ies) and one or more antennas.

The apparatus 900 may be a remote, virtual or cloud apparatus. The apparatus 900 may be either a coder or a decoder, or both a coder and a decoder. The memory 904 may be implemented using any suitable data storage technology, such as semiconductor based memory devices, flash memory, magnetic memory devices and systems, optical memory devices and systems, fixed memory and removable memory. The memory 904 may comprise a database for storing data. The apparatus 900 need not comprise each of the features mentioned, or may comprise other features as well. The apparatus 900 may correspond to or be another embodiment of the apparatus 50 shown in FIG. 1 and FIG. 2, or any of the apparatuses shown in FIG. 3. The apparatus 900 may correspond to or be another embodiment of the apparatuses shown in FIG. 11, including UE 110, RAN node 170, or network element(s) 190.

Figure 10:
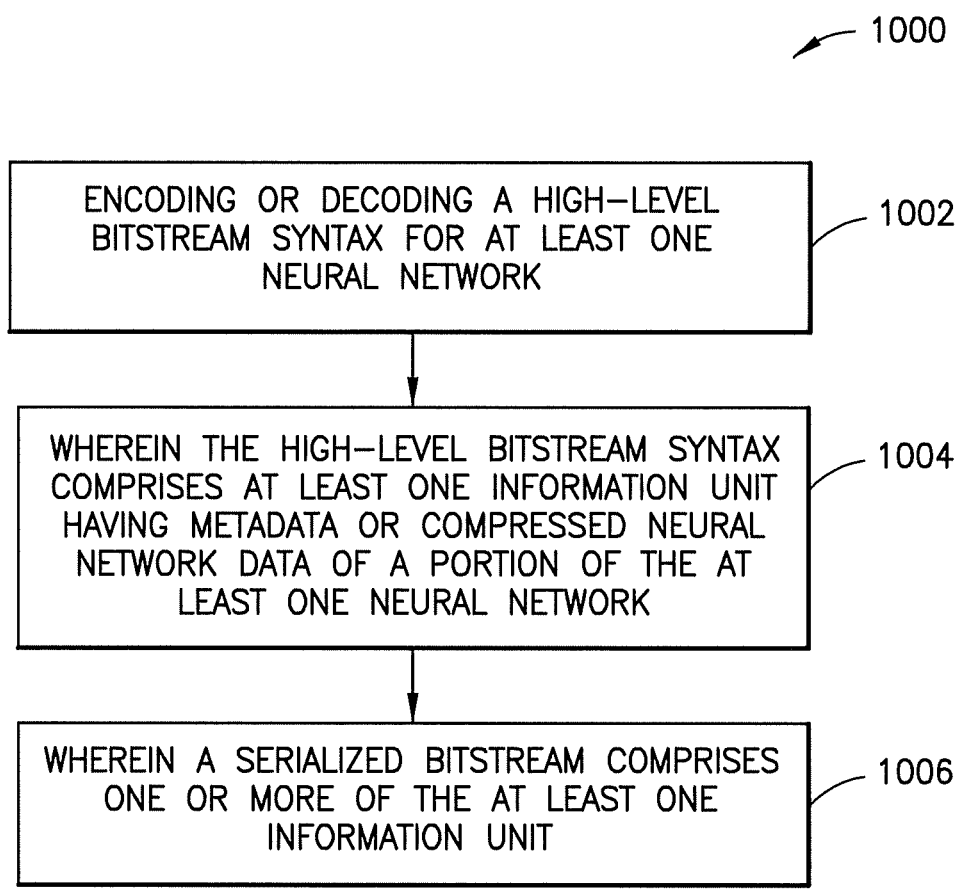
FIG. 10 is an example method to implement a high level syntax for a compressed representation of neural networks.

FIG. 10 is an example method 1000 to implement a high level syntax for a compressed representation of neural networks. At 1002, the method includes encoding or decoding a high-level bitstream syntax for at least one neural network. At 1004, the method includes wherein the high-level bitstream syntax comprises at least one information unit having metadata or compressed neural network data of a portion of the at least one neural network. At 1006, the method includes wherein a serialized bitstream comprises one or more of the at least one information unit.

Figure 11:
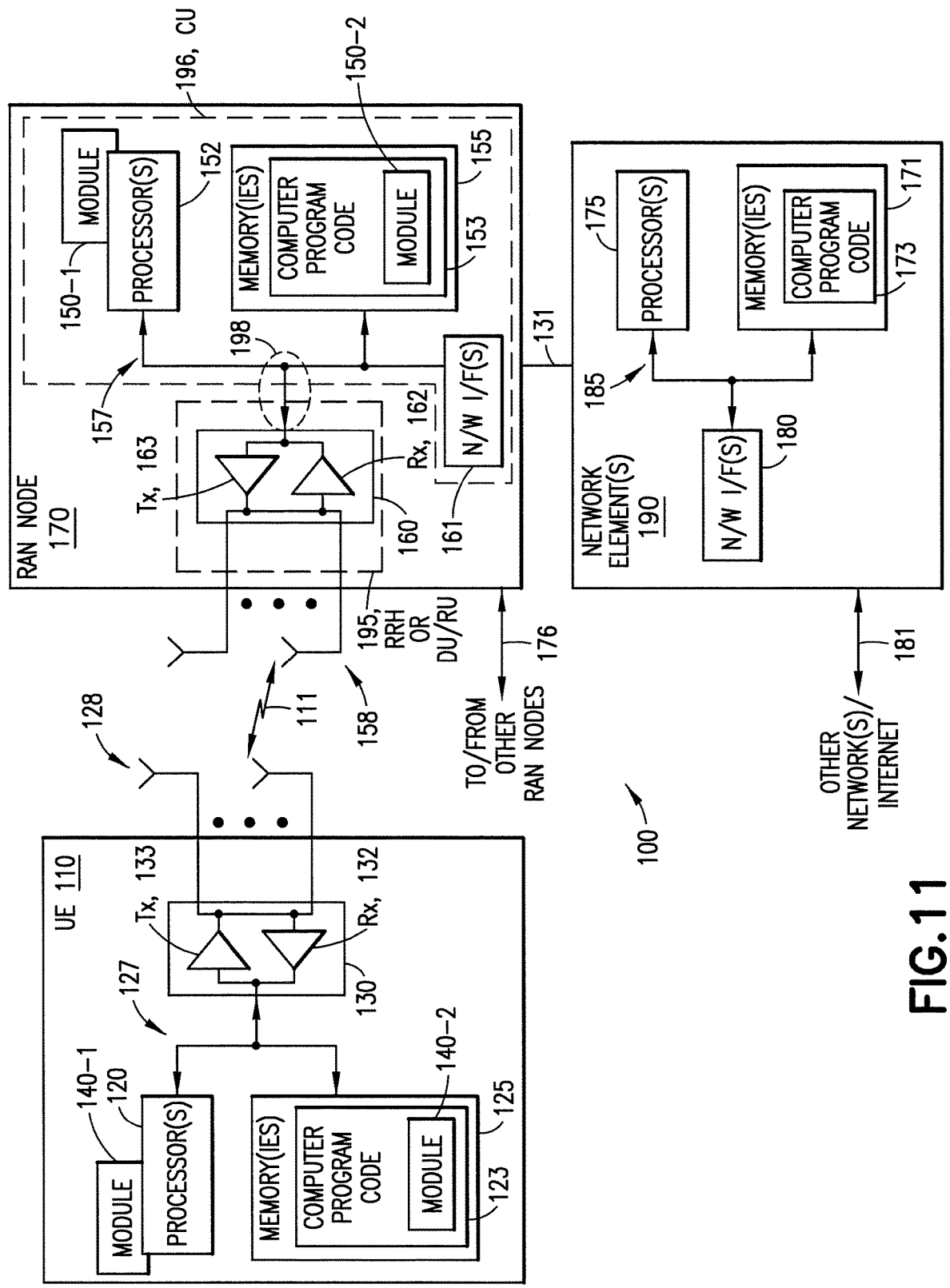
FIG. 11 is a block diagram of one possible and non-limiting system in which the example embodiments may be practiced.

Turning to FIG. 11, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE 110, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU) 196, gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to implement high level syntax for a compressed representation of neural networks based on the examples described herein. Computer program code 173 may also be configured to implement high level syntax for a compressed representation of neural networks based on the examples described herein.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network; wherein the high-level bitstream syntax comprises at least one information unit having metadata or compressed neural network data of a portion of the at least one neural network; and wherein a serialized bitstream comprises one or more of the at least one information unit.

The apparatus may further include wherein the serialized bitstream is stored as a file in a virtual or non-virtual directory tree structure, or sent as a stream of bits over a data pipe.

The apparatus may further include wherein the portion of the at least one neural network is at least one of a layer, a filter, a kernel, a bias, quantization weights, a tensor, or any other data structure which is an identifiable portion of the at least one neural network.

The apparatus may further include wherein the information unit comprises: a unit size that signals a size of the information unit; a unit payload that carries compressed or uncompressed data related to the neural network; and a unit header having information about the type of data carried by the unit payload.

The apparatus may further include wherein the unit payload comprises at least one of: a parameter set comprising global information about the neural network; topology data; a compressed or uncompressed neural network data unit payload; complete or partial neural network data; quantization data; or a start code related payload data.

The apparatus may further include wherein at least one of the topology data, the compressed or uncompressed neural network data unit payload, or the quantization data is partitioned into multiple information units.

The apparatus may further include wherein the unit header comprises information to indicate the partitioning.

The apparatus may further include wherein the information to indicate the partitioning is represented by a counter that counts backwards in order to indicate a number of partitions used.

The apparatus may further include wherein a flag in the unit header indicates the partitioning, and another flag in the unit header indicates a last information unit which belongs to the partitioned data.

The apparatus may further include wherein the multiple information units have the same identifiers in their respective unit header to indicate neural network level information that a partition belongs to.

The apparatus may further include wherein a neural network exchange format is utilized to carry the compressed neural network data.

The apparatus may further include wherein the compressed neural network data unit payload is mappable to the topology data via references or labels within a unit header associated with the compressed network data unit payload, wherein the references or labels comprise at least one of a unique identifier, a unique string, or a relative or absolute uniform resource identifier or locator.

The apparatus may further include wherein the unit header indicates the start of the serialized bitstream.

The apparatus may further include wherein an encoder provides the serialized bitstream to a decoder over a transmission channel.

The apparatus may further include wherein the decoding of the high-level syntax comprises: parsing the at least one information unit by reading a size of the unit, a unit header associated with the information unit, and a payload associated with the information unit; and identifying and parsing at least one of topology data, quantization data, or compressed or uncompressed data associated with the information unit.

The apparatus may further include wherein the at least one memory and the computer program code are further configured to, with the at least one processor, cause the apparatus at least to perform: check for the presence of a start unit indicating the start of the bitstream and beginning of the decoding at the start of the bitstream.

The apparatus may further include wherein the at least one memory and the computer program code are further configured to, with the at least one processor, cause the apparatus at least to perform: further compress the compressed data associated with the information unit.

Other aspects of the apparatus may include the following. The information unit may comprise: a unit size that signals a byte size of the information unit; a unit payload that carries compressed or uncompressed data related to the at least one neural network and related metadata; and a unit header having information about the type of data carried by the unit payload and related metadata. The unit payload may comprise at least one of: a parameter set comprising global metadata and information about the at least one neural network; neural network topology information and related data; compressed or uncompressed neural network data which is complete or partial; quantization data; or a compressed neural network bitstream start indicator or start code related payload data. A neural network unit header may comprise information to indicate the partitioning. A counter value of 0 may indicate no partial information and the counter value being greater than 0 may indicate an index of the partial information. The multiple information units may have the same unique identifiers in their respective unit headers to indicate neural network topology element level information that a partition belongs to. The unique identifiers may be Khronos Neural Network Exchange Format (NNEF) variable identifiers or labels in NNEF topology graph. The topology information may comprise Khronos Neural Network Exchange Format (NNEF) topology information. The multiple information units may have a flag in their unit headers to indicate whether such information units are independently decodable. The parameter set may contain a flag which indicates the presence and carriage of topology units in the compressed neural network bitstream. The parameter set may contain a flag which indicates whether sparsification is applied to the at least one neural network. The parameter set may contain a sparsification performance map data structure that signals a mapping between different sparsification thresholds and resulting neural network inference accuracies. The resulting neural network inference accuracies may correspond to a performance of the at least one neural network in terms of output accuracy. A unit payload or header may contain a quantization map data structure that signals a codebook that comprises a mapping between quantized values and corresponding dequantized values. The unit header may indicate a neural network unit type which indicates the start of the serialized bitstream, where the serialized bitstream is a compressed or uncompressed neural network bitstream. The decoding of the high-level syntax may comprise: parsing the at least one information unit by reading a size of the unit, a unit header associated with the information unit, and a payload associated with the information unit; and identifying and parsing at least one of topology data, quantization data, start code indicator data, parameter set data or compressed or uncompressed data associated with the information unit.

An example apparatus includes means for encoding or decoding a high-level bitstream syntax for at least one neural network; wherein the high-level bitstream syntax comprises at least one information unit having metadata or compressed neural network data of a portion of the at least one neural network; and wherein a serialized bitstream comprises one or more of the at least one information unit.

Other aspects of the apparatus may include the following. The serialized bitstream may be stored as a file in a virtual or non-virtual directory tree structure, or sent as a stream of bits over a data pipe. The portion of the at least one neural network may be at least one of a layer, a filter, a kernel, a bias, quantization weights, a tensor, or any other data structure which is an identifiable portion of the at least one neural network. The information unit may comprise a unit size that signals a byte size of the information unit; a unit payload that carries compressed or uncompressed data related to the at least one neural network and related metadata; and a unit header having information about the type of data carried by the unit payload and related metadata. The unit payload may comprise at least one of: a parameter set comprising global metadata and information about the at least one neural network; neural network topology information and related data; compressed or uncompressed neural network data which is complete or partial; quantization data; or a compressed neural network bitstream start indicator or start code related payload data. At least one of the topology data, the compressed or uncompressed neural network data unit payload, or the quantization data may be partitioned into multiple information units. A neural network unit header may comprise information to indicate the partitioning. The information to indicate the partitioning may be represented by a counter that counts backwards in order to indicate a number of partitions used. A counter value of 0 may indicate no partial information and the counter value being greater than 0 may indicate an index of the partial information. The multiple information units may have the same unique identifiers in their respective unit headers to indicate neural network topology element level information that a partition belongs to. The unique identifiers may be Khronos Neural Network Exchange Format (NNEF) variable identifiers or labels in NNEF topology graph. The topology information may comprise Khronos Neural Network Exchange Format (NNEF) topology information. The multiple information units may have a flag in their unit headers to indicate whether such information units are independently decodable. The parameter set may contain a flag which indicates the presence and carriage of topology units in the compressed neural network bitstream. The parameter set may contain a flag which indicates whether sparsification is applied to the at least one neural network. The parameter set may contain a sparsification performance map data structure that signals a mapping between different sparsification thresholds and resulting neural network inference accuracies. The resulting neural network inference accuracies may correspond to a performance of the at least one neural network in terms of output accuracy. A unit payload or header may contain a quantization map data structure that signals a codebook that comprises a mapping between quantized values and corresponding dequantized values. A neural network exchange format may be utilized to carry the compressed neural network data. The compressed neural network data unit payload may be mappable to the topology data via references or labels within a unit header associated with the compressed network data unit payload, wherein the references or labels comprise at least one of a unique identifier, a unique string, or a relative or absolute uniform resource identifier or locator. The unit header may indicate a neural network unit type which indicates the start of the serialized bitstream, where the serialized bitstream is a compressed or uncompressed neural network bitstream. An encoder may provide the serialized bitstream to a decoder over a transmission channel. The decoding of the high-level syntax may comprise: parsing the at least one information unit by reading a size of the unit, a unit header associated with the information unit, and a payload associated with the information unit; and identifying and parsing at least one of topology data, quantization data, start code indicator data, parameter set data or compressed or uncompressed data associated with the information unit. The apparatus may further include means for checking for the presence of a start unit indicating the start of the bitstream and beginning of the decoding at the start of the bitstream. The apparatus may further include means for further compressing the compressed data associated with the information unit.

An example method includes encoding or decoding a high-level bitstream syntax for at least one neural network; wherein the high-level bitstream syntax comprises at least one information unit having metadata or compressed neural network data of a portion of the at least one neural network; and wherein a serialized bitstream comprises one or more of the at least one information unit.

Other aspects of the method may include the following. The serialized bitstream may be stored as a file in a virtual or non-virtual directory tree structure, or sent as a stream of bits over a data pipe. The portion of the at least one neural network may be at least one of a layer, a filter, a kernel, a bias, quantization weights, a tensor, or any other data structure which is an identifiable portion of the at least one neural network. The information unit may comprise: a unit size that signals a byte size of the information unit; a unit payload that carries compressed or uncompressed data related to the at least one neural network and related metadata; and a unit header having information about the type of data carried by the unit payload and related metadata. The unit payload may comprise at least one of: a parameter set comprising global metadata and information about the at least one neural network; neural network topology information and related data; compressed or uncompressed neural network data which is complete or partial; quantization data; or a compressed neural network bitstream start indicator or start code related payload data. At least one of the topology data, the compressed or uncompressed neural network data unit payload, or the quantization data may be partitioned into multiple information units. A neural network unit header may comprise information to indicate the partitioning. The information to indicate the partitioning may be represented by a counter that counts backwards in order to indicate a number of partitions used. A counter value of 0 may indicate no partial information and the counter value being greater than 0 may indicate an index of the partial information. The multiple information units may have the same unique identifiers in their respective unit headers to indicate neural network topology element level information that a partition belongs to. The unique identifiers may be Khronos Neural Network Exchange Format (NNEF) variable identifiers or labels in NNEF topology graph. The topology information may comprise Khronos Neural Network Exchange Format (NNEF) topology information. The multiple information units may have a flag in their unit headers to indicate whether such information units are independently decodable. The parameter set may contain a flag which indicates the presence and carriage of topology units in the compressed neural network bitstream. The parameter set may contain a flag which indicates whether sparsification is applied to the at least one neural network. The parameter set may contain a sparsification performance map data structure that signals a mapping between different sparsification thresholds and resulting neural network inference accuracies. The resulting neural network inference accuracies may correspond to a performance of the at least one neural network in terms of output accuracy. A unit payload or header may contain a quantization map data structure that signals a codebook that comprises a mapping between quantized values and corresponding dequantized values. A neural network exchange format may be utilized to carry the compressed neural network data. The compressed neural network data unit payload may be mappable to the topology data via references or labels within a unit header associated with the compressed network data unit payload, wherein the references or labels may comprise at least one of a unique identifier, a unique string, or a relative or absolute uniform resource identifier or locator. The unit header may indicate a neural network unit type which indicates the start of the serialized bitstream, where the serialized bitstream is a compressed or uncompressed neural network bitstream. An encoder may provide the serialized bitstream to a decoder over a transmission channel. The decoding of the high-level syntax may comprise: parsing the at least one information unit by reading a size of the unit, a unit header associated with the information unit, and a payload associated with the information unit; and identifying and parsing at least one of topology data, quantization data, start code indicator data, parameter set data or compressed or uncompressed data associated with the information unit. The method may further include checking for the presence of a start unit indicating the start of the bitstream and beginning of the decoding at the start of the bitstream. The method may further include further compressing the compressed data associated with the information unit.

An example non-transitory program storage device readable by a machine, tangibly embodying a program of instructions executable by the machine for performing operations is provided, the operations comprising: encoding or decoding a high-level bitstream syntax for at least one neural network; wherein the high-level bitstream syntax comprises at least one information unit having metadata or compressed neural network data of a portion of the at least one neural network; and wherein a serialized bitstream comprises one or more of the at least one information unit.

Other aspects of the non-transitory program storage device may include the following. The serialized bitstream may be stored as a file in a virtual or non-virtual directory tree structure, or sent as a stream of bits over a data pipe. The portion of the at least one neural network may be at least one of a layer, a filter, a kernel, a bias, quantization weights, a tensor, or any other data structure which is an identifiable portion of the at least one neural network. The information unit may comprise: a unit size that signals a byte size of the information unit; a unit payload that carries compressed or uncompressed data related to the at least one neural network and related metadata; and a unit header having information about the type of data carried by the unit payload and related metadata. The unit payload may comprise at least one of: a parameter set comprising global metadata and information about the at least one neural network; neural network topology information and related data; compressed or uncompressed neural network data which is complete or partial; quantization data; or a compressed neural network bitstream start indicator or start code related payload data. At least one of the topology data, the compressed or uncompressed neural network data unit payload, or the quantization data may be partitioned into multiple information units. A neural network unit header may comprise information to indicate the partitioning. The information to indicate the partitioning may be represented by a counter that counts backwards in order to indicate a number of partitions used. A counter value of 0 may indicate no partial information and the counter value being greater than 0 may indicate an index of the partial information. The multiple information units may have the same unique identifiers in their respective unit headers to indicate neural network topology element level information that a partition belongs to. The unique identifiers may be Khronos Neural Network Exchange Format (NNEF) variable identifiers or labels in NNEF topology graph. The topology information may comprise Khronos Neural Network Exchange Format (NNEF) topology information. The multiple information units may have a flag in their unit headers to indicate whether such information units are independently decodable. The parameter set may contain a flag which indicates the presence and carriage of topology units in the compressed neural network bitstream. The parameter set may contain a flag which indicates whether sparsification is applied to the at least one neural network. The parameter set may contain a sparsification performance map data structure that signals a mapping between different sparsification thresholds and resulting neural network inference accuracies. The resulting neural network inference accuracies may correspond to a performance of the at least one neural network in terms of output accuracy. A unit payload or header may contain a quantization map data structure that signals a codebook that comprises a mapping between quantized values and corresponding dequantized values. A neural network exchange format may be utilized to carry the compressed neural network data. The compressed neural network data unit payload may be mappable to the topology data via references or labels within a unit header associated with the compressed network data unit payload, wherein the references or labels comprise at least one of a unique identifier, a unique string, or a relative or absolute uniform resource identifier or locator. The unit header may indicate a neural network unit type which indicates the start of the serialized bitstream, where the serialized bitstream is a compressed or uncompressed neural network bitstream. An encoder may provide the serialized bitstream to a decoder over a transmission channel. The decoding of the high-level syntax may comprise: parsing the at least one information unit by reading a size of the unit, a unit header associated with the information unit, and a payload associated with the information unit; and identifying and parsing at least one of topology data, quantization data, start code indicator data, parameter set data or compressed or uncompressed data associated with the information unit. The operations of the non-transitory program storage device may further include checking for the presence of a start unit indicating the start of the bitstream and beginning of the decoding at the start of the bitstream. The operations of the non-transitory program storage device may further include further compressing the compressed data associated with the information unit.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one non-transitory memory including computer program code;
   wherein the at least one memory and the computer program code are configured to, with the at least one processor, cause the apparatus at least to perform:
   encode or decode a high-level bitstream syntax for at least one neural network;
   wherein the high-level bitstream syntax comprises at least one information unit having metadata or compressed neural network data of a portion of the at least one neural network; and
   wherein a serialized bitstream comprises one or more of the at least one information unit;
   wherein the information unit comprises: a unit size that signals a byte size of the information unit; a unit payload that carries compressed or uncompressed data related to the at least one neural network and related metadata; and a unit header having information about the type of data carried by the unit payload and related metadata;
   wherein the unit payload comprises at least one of: a parameter set comprising global metadata and information about the at least one neural network; neural network topology information and related data; compressed or uncompressed neural network data which is complete or partial; quantization data; or a compressed neural network bitstream start indicator or start code related payload data.

2. The apparatus of claim 1, wherein the serialized bitstream is stored as a file in a virtual or non-virtual directory tree structure, or sent as a stream of bits over a data pipe.

3. The apparatus of claim 1, wherein the portion of the at least one neural network is at least one of a layer, a filter, a kernel, a bias, quantization weights, a tensor, or any other data structure which is an identifiable portion of the at least one neural network.

4. The apparatus of claim 1, wherein at least one of the topology data, the compressed or uncompressed neural network data unit payload, or the quantization data is partitioned into multiple information units.

5. The apparatus of claim 4, wherein a neural network unit header comprises information to indicate the partitioning.

6. The apparatus of claim 5, wherein the information to indicate the partitioning is represented by a counter that counts backwards in order to indicate a number of partitions used.

7. The apparatus of claim 5, wherein a counter value of 0 indicates no partial information and the counter value greater than 0 indicates an index of the partial information.

8. The apparatus of claim 4, wherein the multiple information units have the same unique identifiers in their respective unit headers to indicate neural network topology element level information that a partition belongs to.

9. The apparatus of claim 8, wherein the unique identifiers are Khronos Neural Network Exchange Format (NNEF) variable identifiers or labels in NNEF topology graph.

10. The apparatus of claim 4, wherein the topology information comprises Khronos Neural Network Exchange Format (NNEF) topology information.

11. The apparatus of claim 4, wherein the multiple information units have a flag in their unit headers to indicate whether such information units are independently decodable.

12. The apparatus of claim 1, wherein the parameter set contains a flag which indicates the presence and carriage of topology units in the compressed neural network bitstream.

13. The apparatus of claim 1, wherein the parameter set contains a flag which indicates whether sparsification is applied to the at least one neural network.

14. The apparatus of claim 1, wherein the parameter set contains a sparsification performance map data structure that signals a mapping between different sparsification thresholds and resulting neural network inference accuracies.

15. The apparatus of claim 14, where the resulting neural network inference accuracies correspond to a performance of the at least one neural network in terms of output accuracy.

16. The apparatus of claim 1, wherein a unit payload or header contains a quantization map data structure that signals a codebook that comprises a mapping between quantized values and corresponding dequantized values.

17. The apparatus of claim 1, wherein a neural network exchange format is utilized to carry the compressed neural network data.

18. The apparatus of claim 1, wherein the compressed neural network data unit payload is mappable to the topology data via references or labels within a unit header associated with the compressed network data unit payload, wherein the references or labels comprise at least one of a unique identifier, a unique string, or a relative or absolute uniform resource identifier or locator.

19. The apparatus of claim 1, wherein the unit header indicates a neural network unit type which indicates the start of the serialized bitstream, where the serialized bitstream is a compressed or uncompressed neural network bitstream.

20. The apparatus of claim 1, wherein an encoder provides the serialized bitstream to a decoder over a transmission channel.

21. The apparatus of claim 1, wherein the decoding of the high-level syntax comprises:
    parsing the at least one information unit by reading a size of the unit, a unit header associated with the information unit, and a payload associated with the information unit; and
    identifying and parsing at least one of topology data, quantization data, start code indicator data, parameter set data or compressed or uncompressed data associated with the information unit.

22. The apparatus of claim 21, wherein the at least one memory and the computer program code are further configured to, with the at least one processor, cause the apparatus at least to perform:
    check for the presence of a start unit indicating the start of the bitstream and beginning of the decoding at the start of the bitstream.

23. The apparatus of claim 21, wherein the at least one memory and the computer program code are further configured to, with the at least one processor, cause the apparatus at least to perform:
    further compress the compressed data associated with the information unit.

24. A method comprising:
    encoding or decoding a high-level bitstream syntax for at least one neural network;
    wherein the high-level bitstream syntax comprises at least one information unit having metadata or compressed neural network data of a portion of the at least one neural network; and
    wherein a serialized bitstream comprises one or more of the at least one information unit;
    wherein the information unit comprises: a unit size that signals a byte size of the information unit; a unit payload that carries compressed or uncompressed data related to the at least one neural network and related metadata; and a unit header having information about the type of data carried by the unit payload and related metadata;
    wherein the unit payload comprises at least one of: a parameter set comprising global metadata and information about the at least one neural network; neural network topology information and related data; compressed or uncompressed neural network data which is complete or partial; quantization data; or a compressed neural network bitstream start indicator or start code related payload data.

25. A non-transitory program storage device readable by a machine, tangibly embodying a program of instructions executable by the machine for performing operations, the operations comprising:
    encoding or decoding a high-level bitstream syntax for at least one neural network;
    wherein the high-level bitstream syntax comprises at least one information unit having metadata or compressed neural network data of a portion of the at least one neural network; and
    wherein a serialized bitstream comprises one or more of the at least one information unit;
    wherein the information unit comprises: a unit size that signals a byte size of the information unit; a unit payload that carries compressed or uncompressed data related to the at least one neural network and related metadata; and a unit header having information about the type of data carried by the unit payload and related metadata;
    wherein the unit payload comprises at least one of: a parameter set comprising global metadata and information about the at least one neural network; neural network topology information and related data; compressed or uncompressed neural network data which is complete or partial; quantization data; or a compressed neural network bitstream start indicator or start code related payload data.

* * * * *